(12) United States Patent
Gale et al.

(10) Patent No.: US 7,922,246 B2
(45) Date of Patent: Apr. 12, 2011

(54) APPARATUS AND METHOD FOR RESTRAINING AN OBJECT IN A VEHICLE

(75) Inventors: Steve Gale, Colfax, IN (US); Douglas W. Bittner, Indianapolis, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 315 days.

(21) Appl. No.: 11/951,130

(22) Filed: Dec. 5, 2007

(65) Prior Publication Data

US 2008/0128464 A1 Jun. 5, 2008

Related U.S. Application Data

(63) Continuation-in-part of application No. PCT/US2007/77990, filed on Sep. 10, 2007.

(60) Provisional application No. 60/825,612, filed on Sep. 14, 2006.

(51) Int. Cl.
*B60R 21/02* (2006.01)

(52) U.S. Cl. .................. 297/188.06; 297/217.1; 248/313

(58) Field of Classification Search ............. 297/188.06, 297/217.1; 248/313, 316.1, 316.5
See application file for complete search history.

(56) References Cited

U.S. PATENT DOCUMENTS

| | | | |
|---|---|---|---|
| 1,297,024 A | | 3/1919 | Smith |
| 3,547,391 A | * | 12/1970 | Johnson ..................... 248/311.3 |
| 3,823,907 A | * | 7/1974 | Ziaylek, Jr. ................... 248/313 |
| 3,876,164 A | * | 4/1975 | Dully ........................... 297/478 |
| 3,921,950 A | | 11/1975 | Sentinella |
| 4,101,094 A | * | 7/1978 | Wallin ........................ 242/382.1 |
| 4,586,687 A | | 5/1986 | Ziaylek |
| 5,111,902 A | | 5/1992 | Sundeen et al. |
| 5,275,462 A | * | 1/1994 | Pond et al. ................ 297/188.04 |
| 5,314,233 A | * | 5/1994 | Bostrom et al. ............ 297/217.1 |
| 6,702,242 B1 | | 3/2004 | Ziaylek et al. |
| 6,883,766 B1 | * | 4/2005 | Ziaylek et al. ................ 248/313 |
| 2006/0076820 A1 | * | 4/2006 | Lackore ................... 297/452.29 |

FOREIGN PATENT DOCUMENTS

FR 2811579 A1 1/2002

OTHER PUBLICATIONS

Notification Concerning Transmittal of International Preliminary Report on Patentability (Chapter 1 of the Patent Cooperation Treaty) for PCT/US2007/077990 dated Mar. 26, 2009 (14 pages).
Hibbeler, R.C., Engineering Mechanics, 5th ed. New York: Macmillan, 1989.
PCT International Search Report for PCT/US07/77990, Sep. 10, 1997.
PCT Written Opinion for PCT/US07/77990, Sep. 10, 1997.

* cited by examiner

*Primary Examiner* — Peter R. Brown
(74) *Attorney, Agent, or Firm* — Barnes & Thornburg LLP

(57) ABSTRACT

An apparatus for restraining an object in a vehicle may have a frame mounted within the vehicle, a clamp member movably mounted to the frame and a blocking member movably mounted to the frame. The frame may have a first end and a second end opposite the first end. The clamp member may be movable relative to the frame under quasi-static conditions to allow the object to be received between, and removed from between, the clamp member and the second end of the frame. The blocking member may be configured to move relative to the frame under dynamic loading conditions to a position that blocks movement of the clamp member sufficiently to retain the object between the clamp member and the second end of the frame under the dynamic loading conditions.

10 Claims, 27 Drawing Sheets

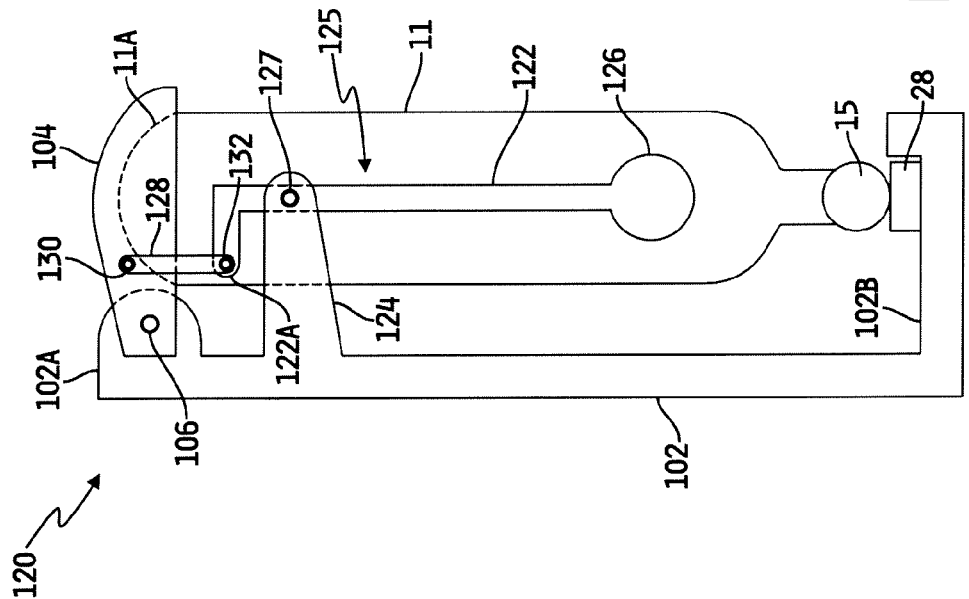
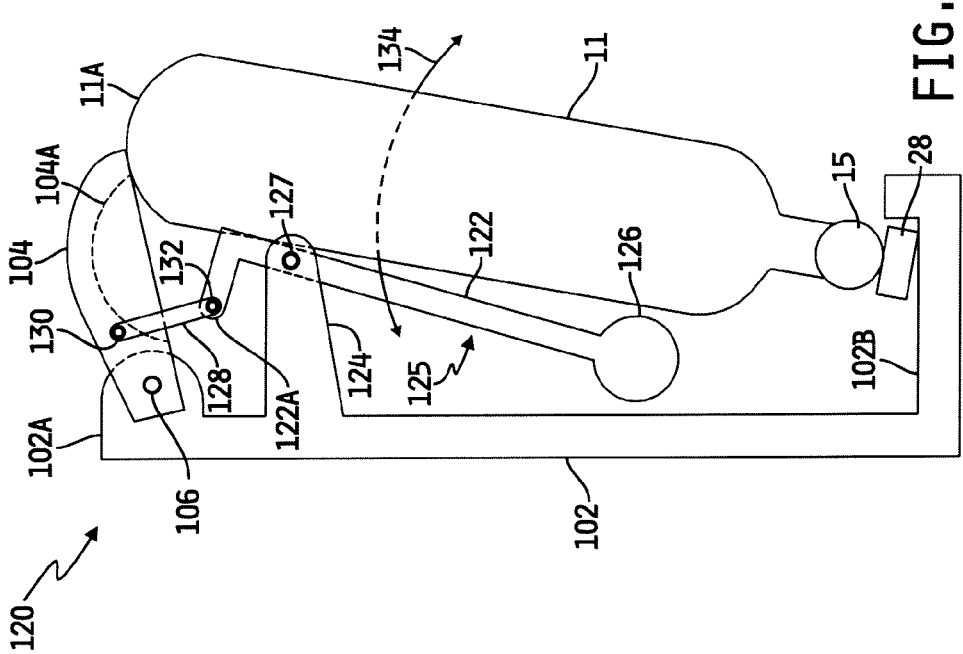
FIG. 13A
FIG. 13B

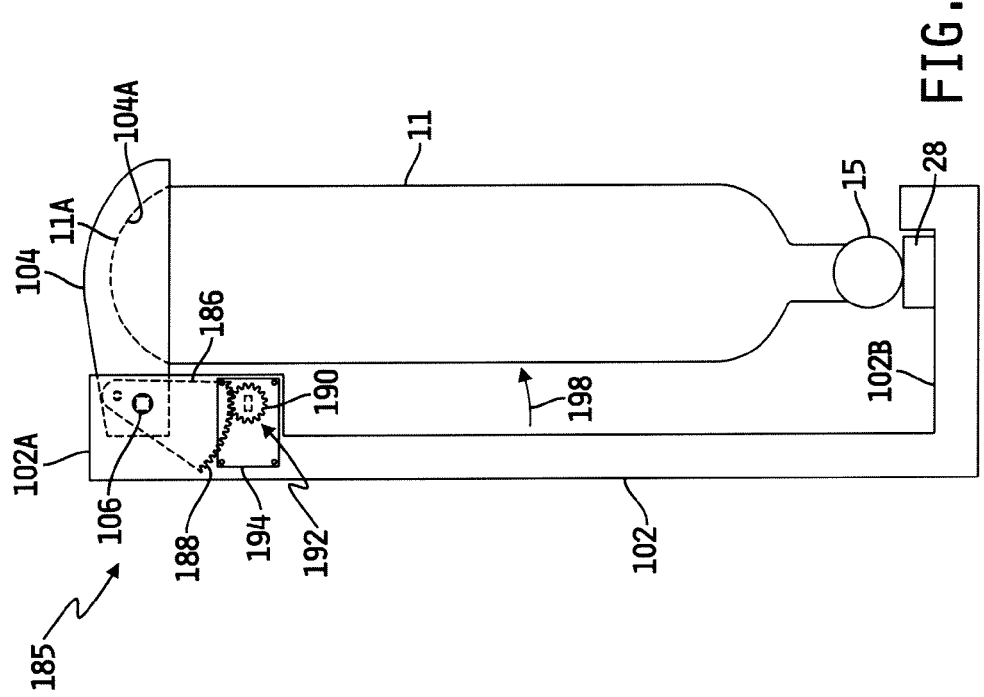
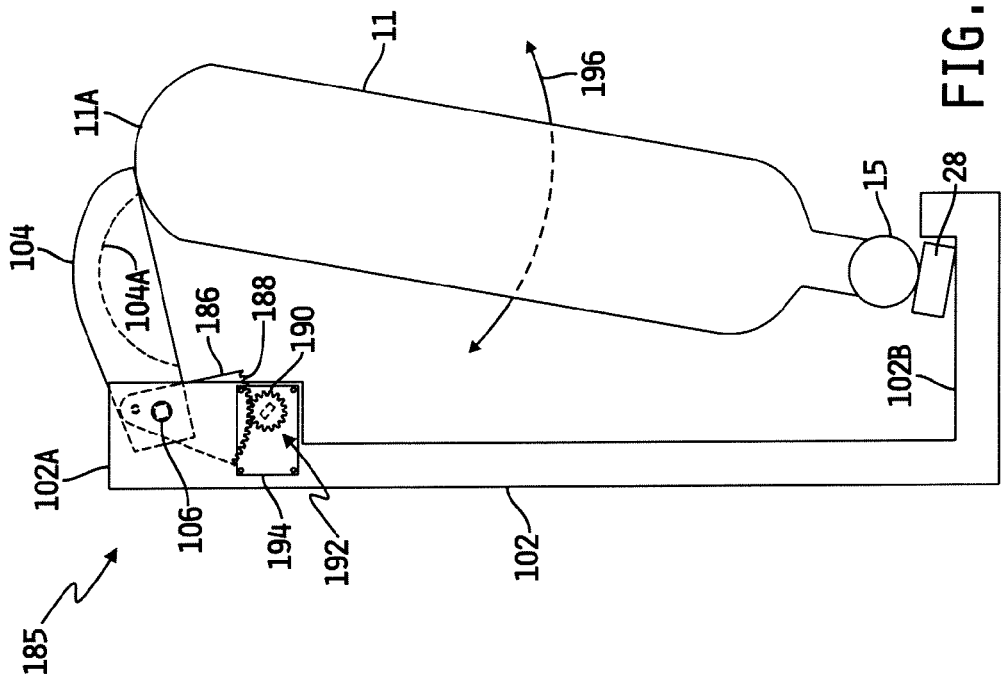

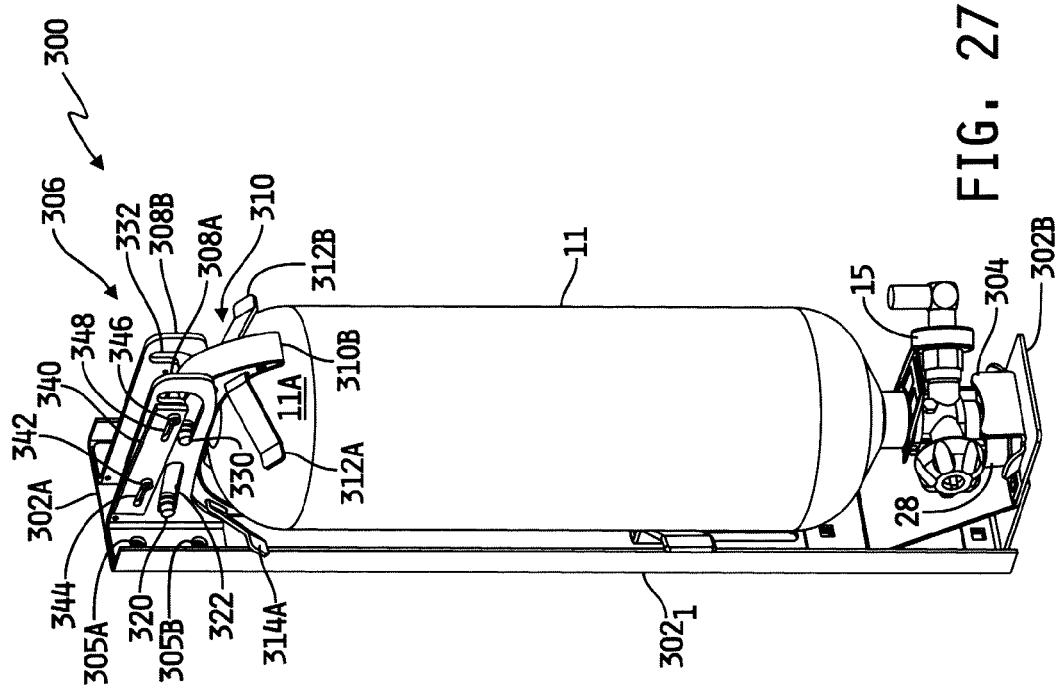
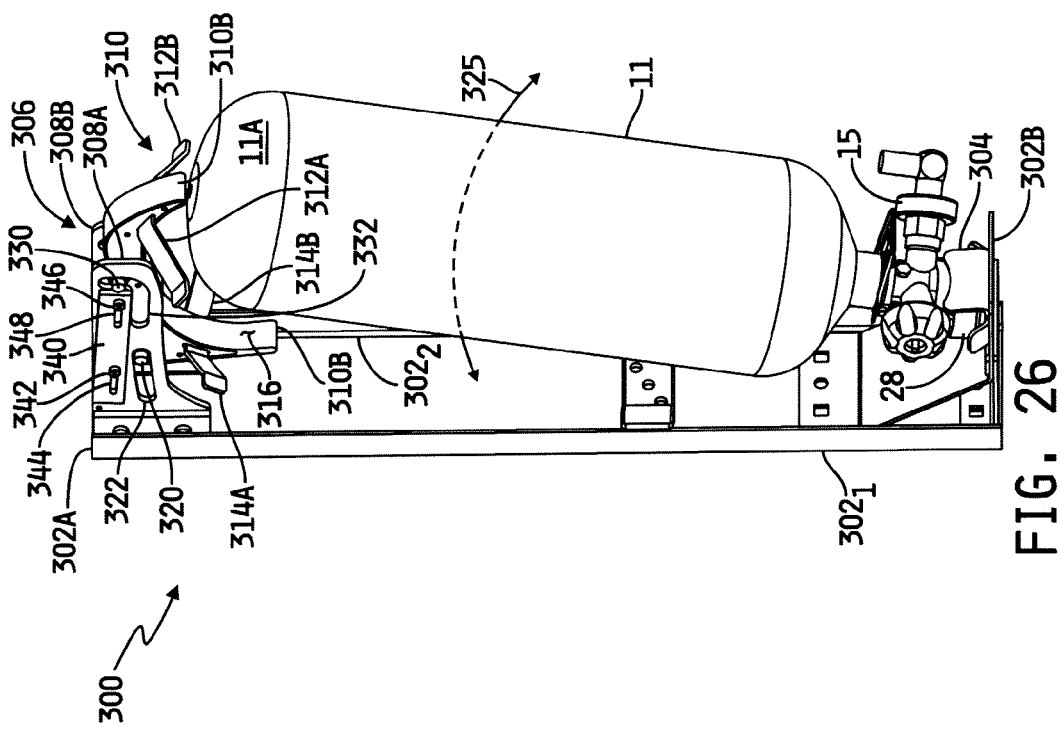
FIG. 26
FIG. 27

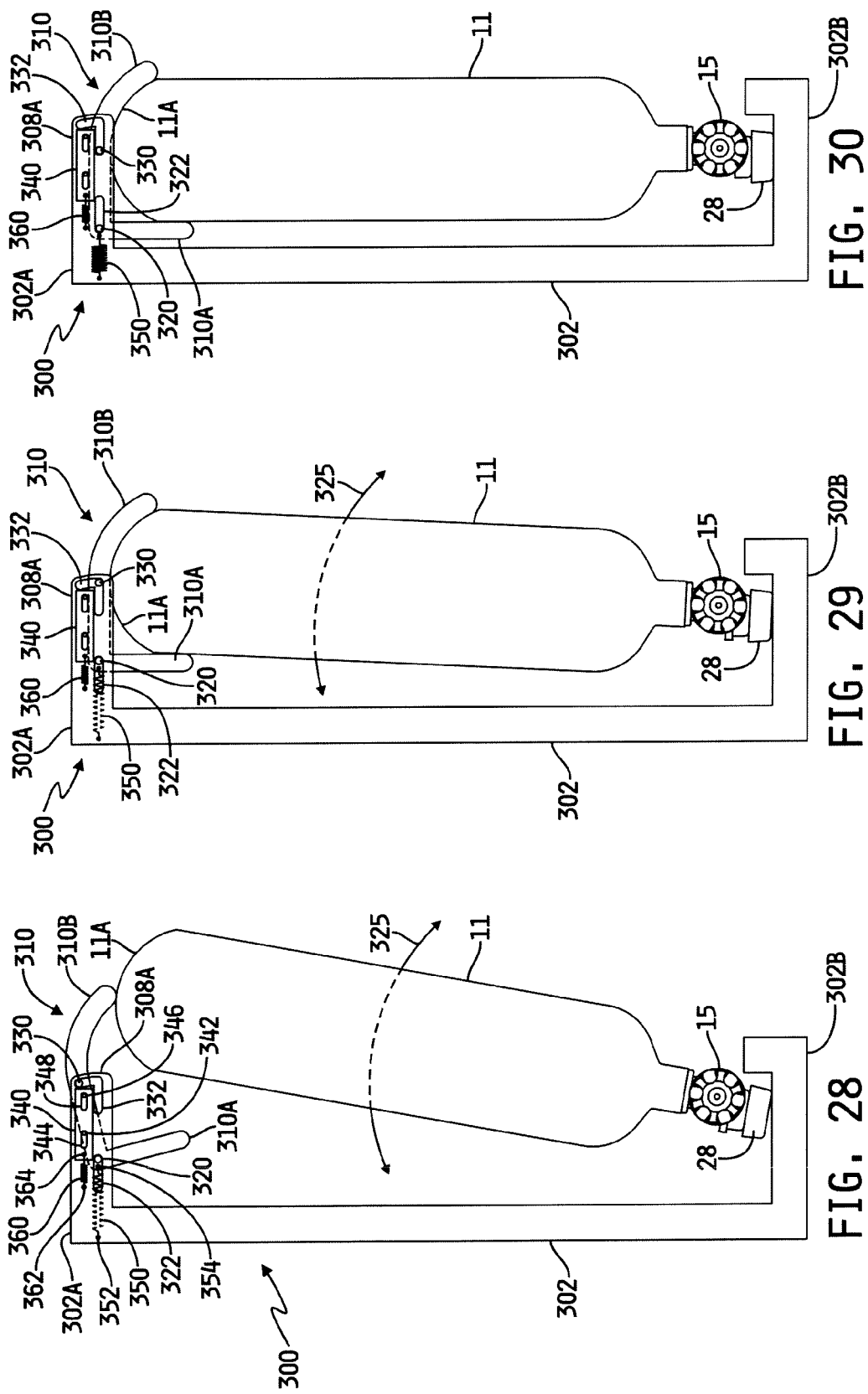

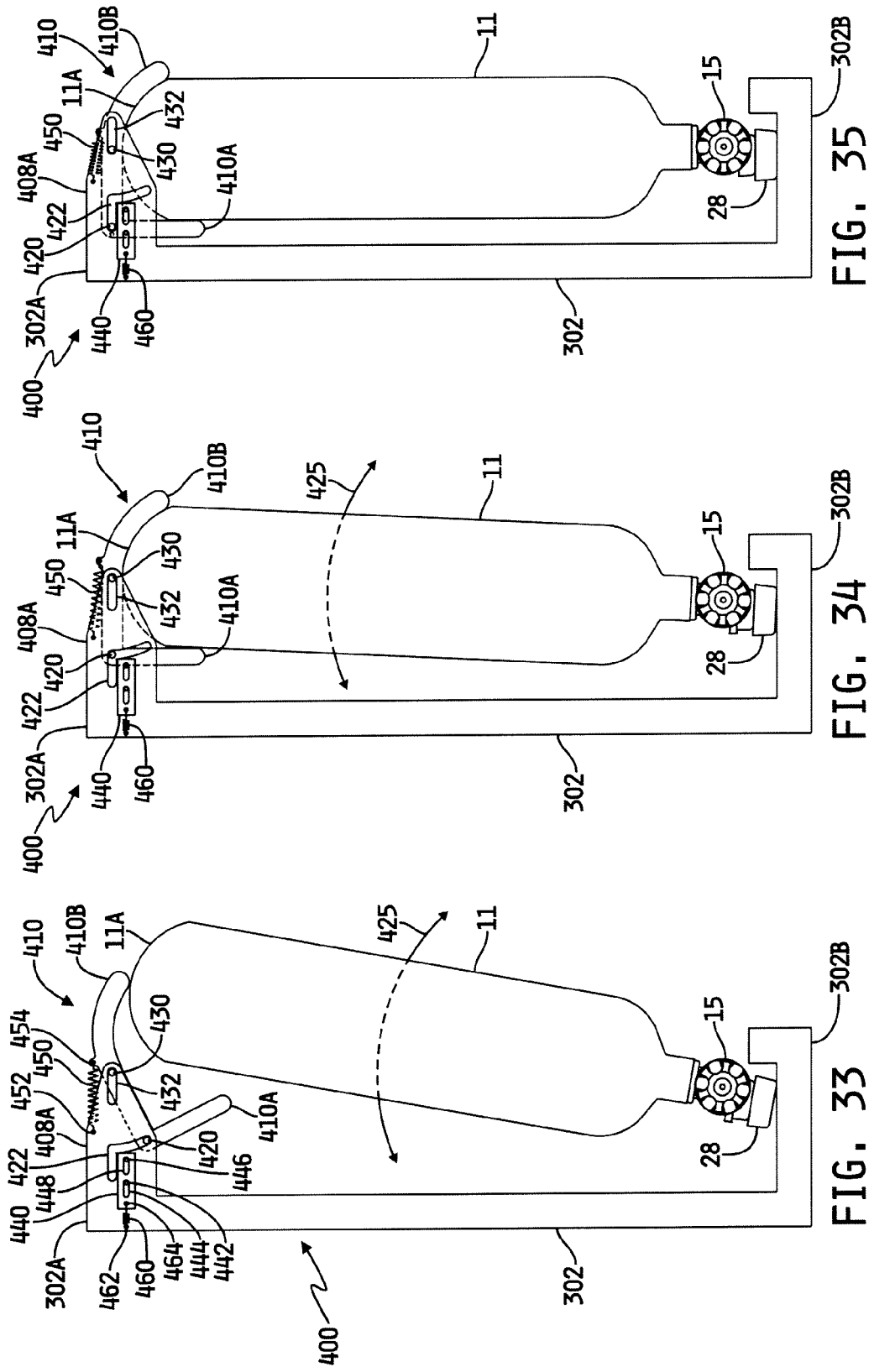

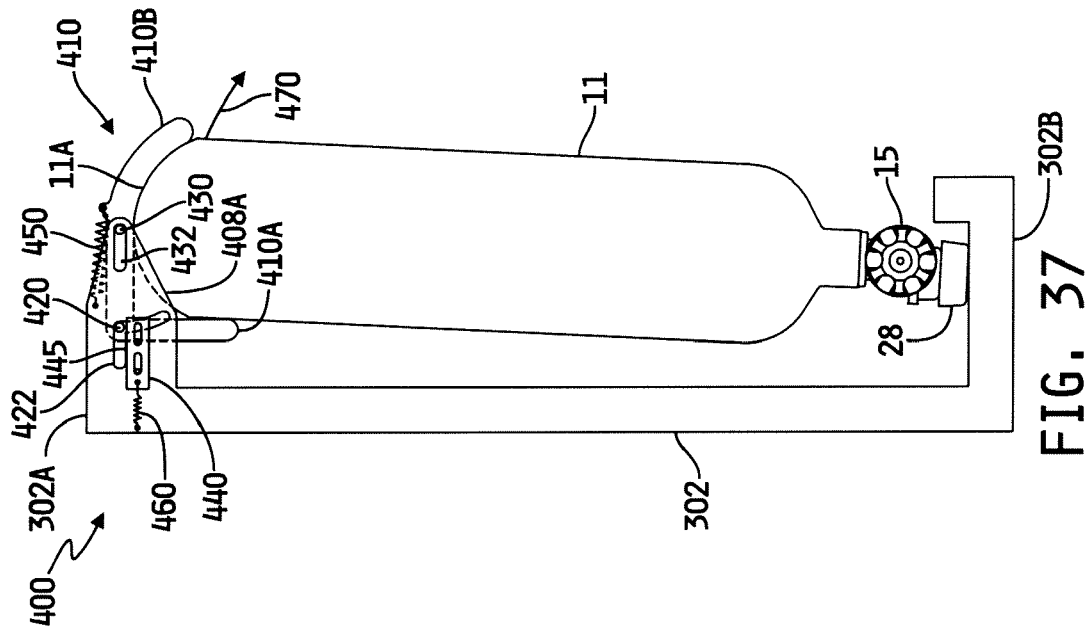
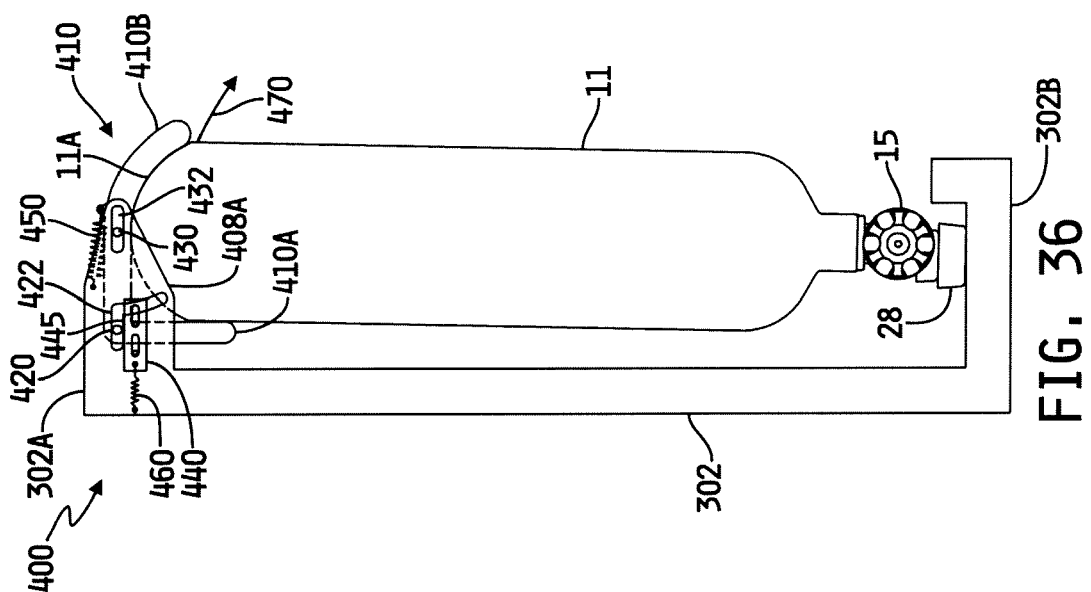

APPARATUS AND METHOD FOR RESTRAINING AN OBJECT IN A VEHICLE

CROSS-REFERENCE TO RELATED APPLICATIONS

This patent application is a continuation-in-part of, and claims priority to, International Application Serial No. PCT/US2007/77990, filed Sep. 10, 2007, which claims priority to U.S. Patent Application Ser. No. 60/825,612, filed Sep. 14, 2006, the disclosures of which are both incorporated herein by reference.

FIELD OF THE INVENTION

The present invention relates generally to restraint systems for transportation vehicles, and more specifically to apparatuses and methods for restraining objects in transportation vehicles.

BACKGROUND

Various mechanisms and apparatuses are known for restraining objects in vehicles. It is desirable to provide such mechanisms and apparatuses with an object restraining structure that allows an object to be easily received within and removed from the mechanism or apparatus under quasi-static conditions, and that retains the object within the mechanism or apparatus under dynamic loading conditions such as may occur during vehicle crash events.

SUMMARY

The present invention may comprise one or more of the features recited in the attached claims, and/or one or more of the following features and combinations thereof. An apparatus for restraining an object in a vehicle may comprise a frame mounted within the vehicle, a clamp member movably mounted to the frame and a blocking member movably mounted to the frame. The frame may have a first end and a second end opposite the first end. The clamp member may be movable relative to the frame under quasi-static conditions to allow the object to be received between, and removed from between, the clamp member and the second end of the frame. The blocking member may be configured to move relative to the frame under dynamic loading conditions to a position that blocks movement of the clamp member sufficiently to retain the object between the clamp member and the second end of the frame under the dynamic loading conditions.

The clamp member may be movably mounted to the frame at or near the first end thereof. The clamp member may be movable relative to the frame under the quasi-static conditions between a first position and a second position. The clamp member may be configured to be movable from the first position to the second position to receive the object between the clamp member and the second end of the frame such that the object is positioned between the clamp member and the second end of the frame when the clamp member is in the second position. The clamp member may be configured to be movable from the second position to the first position to remove the object from between the clamp member and the second end of the frame.

The frame may define at least one channel therein. The clamp member may include at least one protrusion that extends into the at least one channel. The at least one channel and the at least one protrusion may be configured such that the at least one protrusion travels along the at least one channel when the clamp member moves relative to the frame. The blocking member may be configured to block movement of the clamp member relative to the frame by extending at least partially across the at least one channel under the dynamic loading conditions to provide a barrier to travel of the at least one protrusion in at least one direction of travel of the at least one protrusion along the at least one channel.

The vehicle may include a vehicle seat having a seat bottom and a seat back both mounted to a vehicle seat frame that is mounted within the vehicle. The frame may be mounted to the seat back. The frame may further be mounted to the vehicle seat frame.

The object may comprise a cylinder. The cylinder may comprise an air tank for a self contained breathing apparatus.

The apparatus may further comprise a biasing member connected between the frame and the blocking member. This biasing member may be configured to bias the blocking member, under the quasi-static conditions, away from the position that blocks movement of the clamp member. The blocking member may have a mass and the biasing member may be configured to exert a biasing force on the blocking member. The mass of the blocking member may be sized to overcome the biasing force of the biasing member under the dynamic loading conditions such that the blocking member moves to the position that blocks movement of the clamp member before the clamp member moves sufficiently relative to frame to allow the object to be removed from between the clamp member and the second end of the frame.

The apparatus may further comprise a biasing member connected between the frame and the clamp member. This biasing member may be configured to bias the clamp member, under the quasi-static conditions, toward the frame.

A method of restraining an object in a vehicle may comprise providing a frame having a first end and a second end opposite the first end, movably mounting a clamp member to the frame, mounting the frame within the vehicle, placing one end of the object in contact with the second end of the frame and then forcing an opposite end of the object against the clamp member to move the clamp member and the object together into a position in which the object is trapped between the clamp member and the second end of the frame, and movably mounting a blocking member to the frame such that the blocking member moves under dynamic loading conditions to a position that blocks movement of the clamp member sufficiently to retain the object between the clamp member and the second end of the frame under the dynamic loading conditions.

The method may further comprise mounting the frame to a seat back of a vehicle seat that is mounted within the vehicle to a vehicle seat frame. The method may further comprise further mounting the frame to the vehicle seat frame.

Mounting the clamp member to the frame may comprise mounting the claim member to the frame at or near the first end thereof.

The method may further comprise connecting a biasing member between the frame and the blocking member such that the biasing member biases the blocking member, under the quasi-static conditions, away from the position that blocks movement of the clamp member. The blocking member may have a mass and the biasing member may be configured to exert a biasing force on the blocking member. The method may further comprise selecting the mass of the blocking member and the biasing force such that the blocking member overcomes the biasing force of the biasing member under the dynamic loading conditions and moves to the position that blocks movement of the clamp member before the clamp member moves sufficiently relative to frame to allow the object to be removed from between the clamp member and the second end of the frame.

The method may further comprise connecting a biasing member between the frame and the clamp member such that the biasing member biases the clamp member, under the quasi-static conditions, toward the frame.

BRIEF DESCRIPTION OF THE DRAWINGS

FIG. 13A is a side elevational view of the apparatus of FIGS. 11 and 12 shown with one illustrative embodiment of an additional object retaining structure that ensures retention of the object within the apparatus under dynamic loading conditions and shown illustrating advancement of the object into, or removal of the object from, the apparatus.

FIG. 13B is another side elevational view of the apparatus of FIG. 13A illustrated with the object retained therein.

FIG. 18A is a side elevational view of the apparatus of FIGS. 11 and 12 shown with still a further illustrative embodiment of an additional object retraining structure that ensures retention of the object within the apparatus under dynamic loading conditions.

FIG. 18B is a side elevational view of the apparatus of FIG. 18A illustrating operation of the additional object retaining structure under dynamic loading conditions.

FIG. 26 is a perspective view of another illustrative embodiment of an object restraining apparatus.

FIG. 27 is a perspective view of the apparatus of FIG. 26 shown with an object retained therein.

FIG. 28 is a side elevational view of the apparatus of FIGS. 26 and 27 illustrating advancement of the object into, or removal of the object from, the apparatus.

FIG. 29 is a side elevational view of the apparatus of FIGS. 26 and 27 further illustrating advancement of the object into, or removal of the object from, the apparatus.

FIG. 30 is a side elevational view of the apparatus of FIGS. 26 and 27 with the object retained therein.

FIG. 33 is a side elevational view of the yet another illustrative embodiment of an object restraining apparatus illustrating advancement of the object into, or removal of the object from, the apparatus.

FIG. 34 is a side elevational view of the apparatus of FIG. 33 further illustrating advancement of the object into, or removal of the object from, the apparatus.

FIG. 35 is a side elevational view of the apparatus of FIGS. 33 and 34 with the object retained therein.

FIG. 36 is a side elevational view of the apparatus of FIGS. 33-35 illustrating operation of the apparatus under dynamic loading conditions.

FIG. 37 is a side elevational view of the apparatus of FIGS. 33-36 further illustrating operation of the apparatus under dynamic loading conditions.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
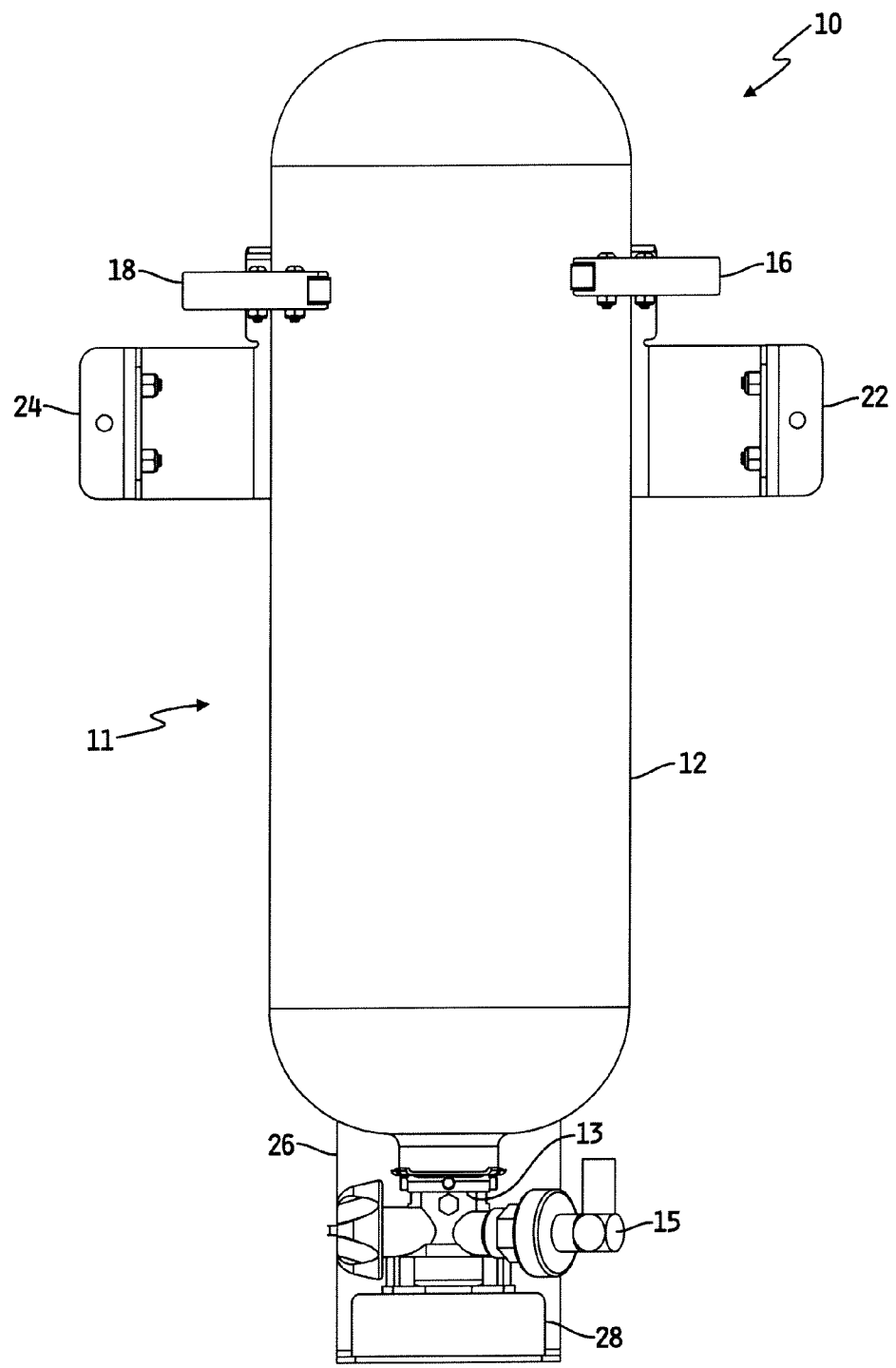
FIG. 1 is a front elevational view of one illustrative embodiment of an apparatus for restraining an object in a vehicle illustrated with a self-contained breathing apparatus (SCBA) tank retained therein.
Figure 2:
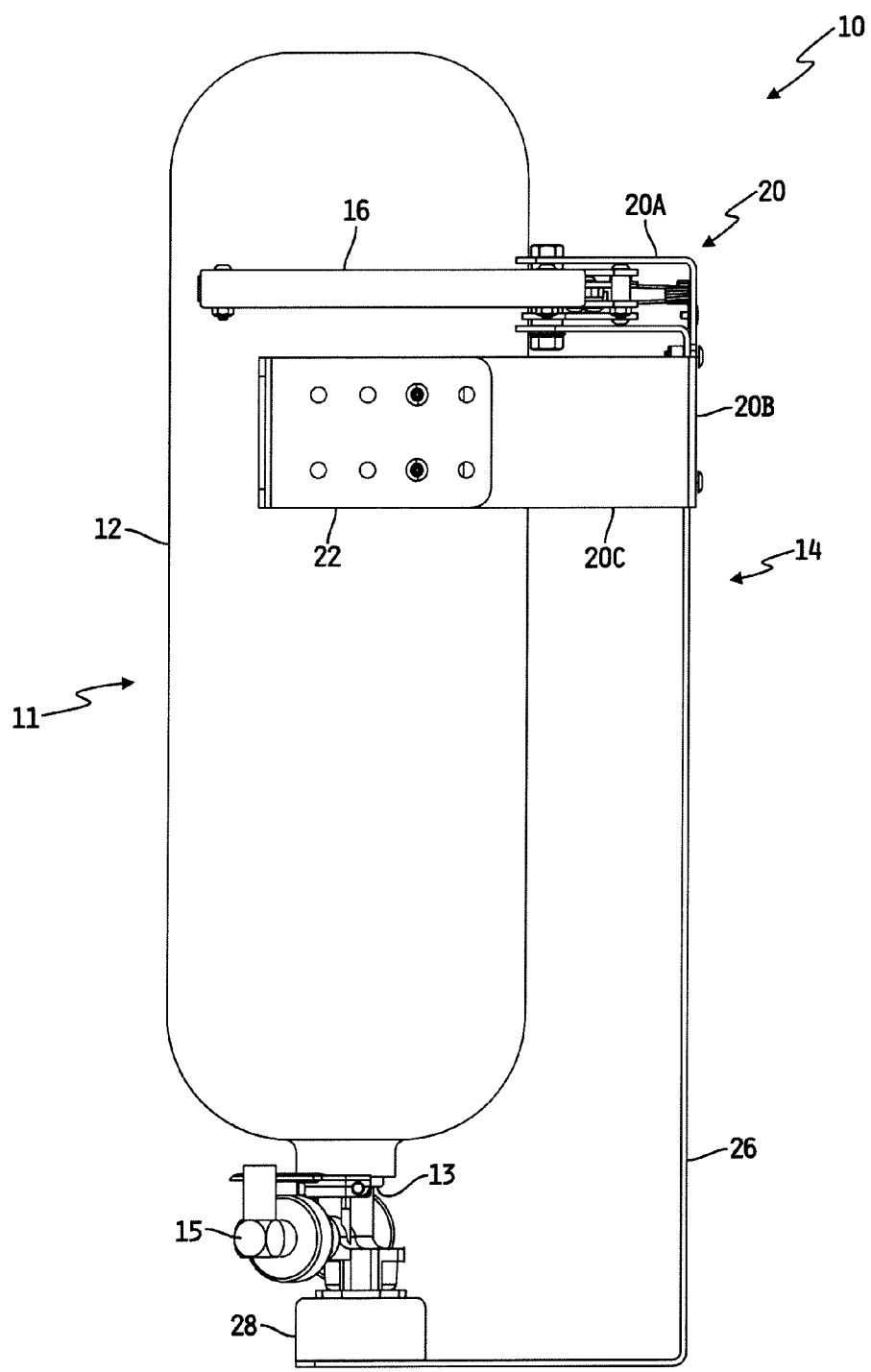
FIG. 2 is a side elevational view of the apparatus of FIG. 1.
Figure 3:
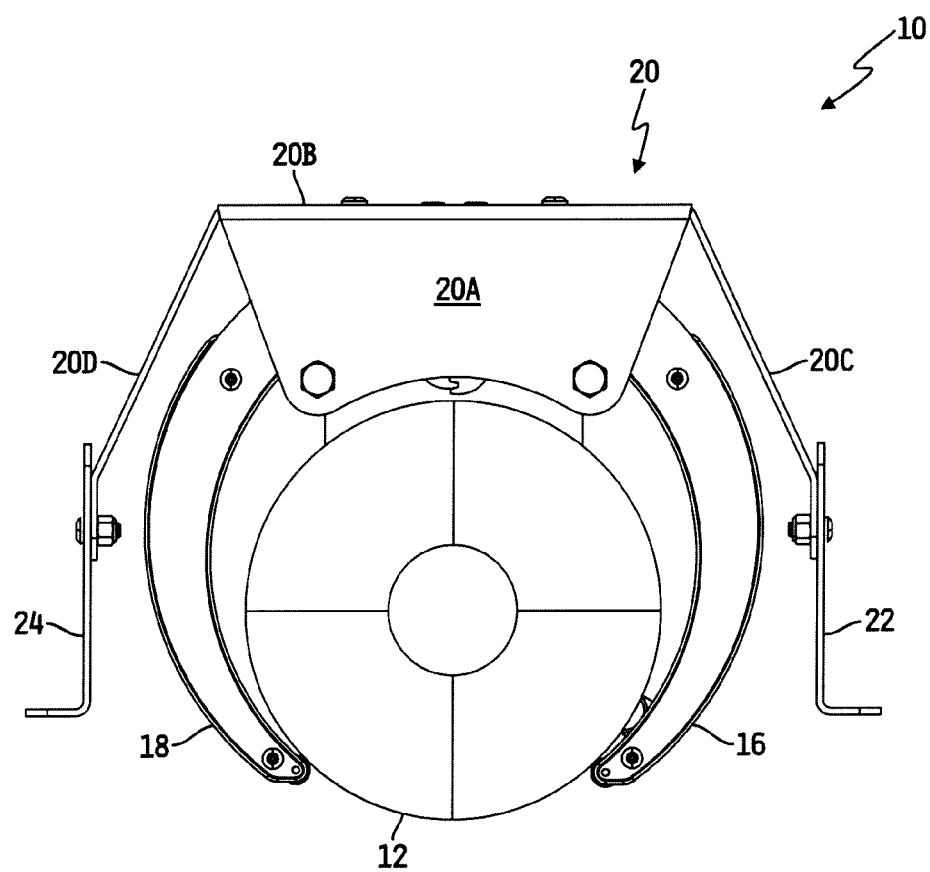
FIG. 3 is a top plan view of the apparatus of FIGS. 1 and 2.

Referring now to FIGS. 1-3, one illustrative embodiment of an apparatus 10 for restraining an object 11 in a vehicle is shown. In the illustrated embodiment, the apparatus 10 includes a frame 14 that is configured to be mounted within a vehicle. The frame 14 includes an upper frame member 20 that is configured to be mounted to the vehicle and to which a pair of gripping arms 16 and 18 are movably mounted, and a lower frame member 26. One end of the object 11 is supported by the lower frame member 26, and an opposite end of the object extends through and between the gripping arms 16 and 18 as shown.

The upper frame member 20 has a top plate 20A and a back plate 20B that form substantially a right angle between the two. Illustratively, the top plate 20A and the back plate 20B may be integral and of unitary construction, although the top plate 20A and the back plate 20B may alternatively be provided as separate components that are attached together in a conventional manner. In any case, the gripping arms 16 and 18 are movably mounted to the top plate 20A, and each define a free end that extends at least partially about the object 11 when the object 11 is positioned within the gripping arms 16 and 18 as shown.

The upper frame member 20 further includes a pair of side flanges 20C and 20D extending away from opposite sides of the back plate 20B at an acute angle relative to a plane defined by the back place 20B. The back plate 20B and the side flanges 20C and 20D may be integral and of unitary construction, although the side flanges 20C and 20D may alternatively be provided as separate components that are attached to the back plate 20B in a conventional manner. A frame mounting ear 22 is attached in a conventional manner to a free end of the side flange 20C and another frame mounted ear 24 is attached in a conventional manner to a free end of the side flange 20D. The frame mounting ears 22 and 24 are configured to be attached to a support structure within the vehicle.

One end of the lower frame member 26 is attached in a conventional manner to the back plate 20B of the upper frame member 20. The lower frame member 26 may illustratively be provided in the form of an elongated plate that forms substantially a right angle near its free end so that the free end of the lower frame member 26 forms a platform that is substantially parallel with a plane defined by the top plate 20A of the upper frame member 20 and the gripping arms 16, 18. In some embodiments, a support member 28 may be attached to the free end of the lower frame member 26 to support and/or engage one end of the object 11, although the support member 28 may be omitted in other embodiments. Although not illustrated in FIGS. 1-3, the free end of the lower frame member 26 may be configured to be attached to a support surface of the vehicle. The various components 20, 22, 24 and 26 of the frame 14 may be formed of any conventional frame/bracket material such as steel or other conventional metal combination, a conventional high-strength plastic material or the like.

The support member 28, in embodiments including a support member 28, may be formed of any conventional rigid or semi-rigid material.

In the illustrated embodiment, the object 11 is a self-contained breathing apparatus (SCBA). The SCBA 11 includes a conventional air cylinder 12 having an air outlet 13 that is fluidly coupled to a conventional air outlet valve 15. In the embodiment illustrated in FIGS. 1-3, the SCBA is received by the apparatus 10 in a vertical position, i.e., parallel with a longitudinal axis defined through the cylinder 12, with the air outlet valve 15 supported by the support member 28 and with the bottom of the cylinder 12 extending through the gripping arms 16, 18. In one embodiment, the support member 28 is configured to support, but to not engage, the air outlet valve 15. In an alternate embodiment, the support member 28 is configured to engage the air outlet valve 15 to restrict horizontal movement of the outlet valve end of the SCBA 11 relative to the frame 14.

Figure 4:
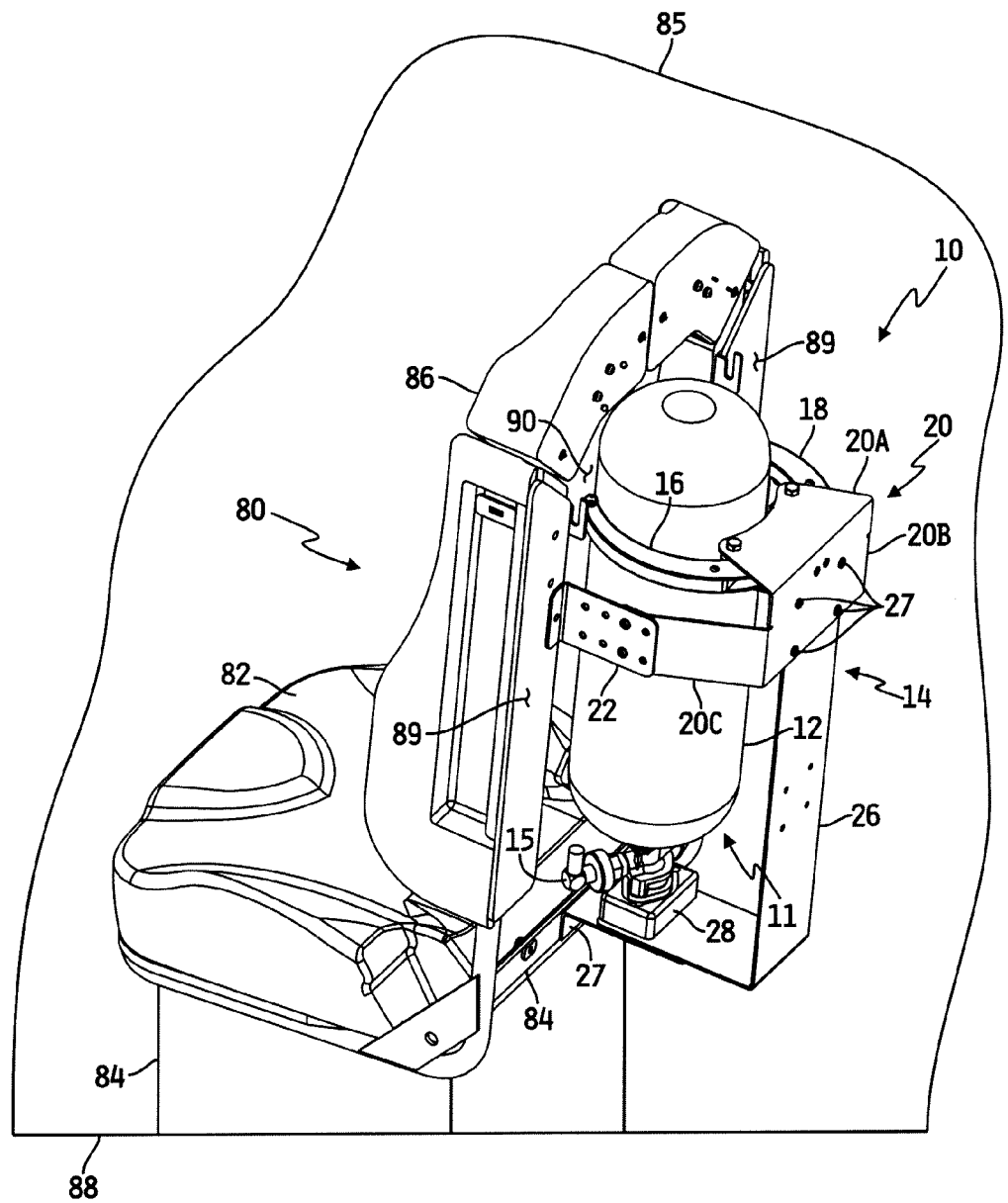
FIG. 4 is a rear perspective view of the apparatus of FIGS. 1-3 mounted to a rear portion of a vehicle seat.
Figure 5:
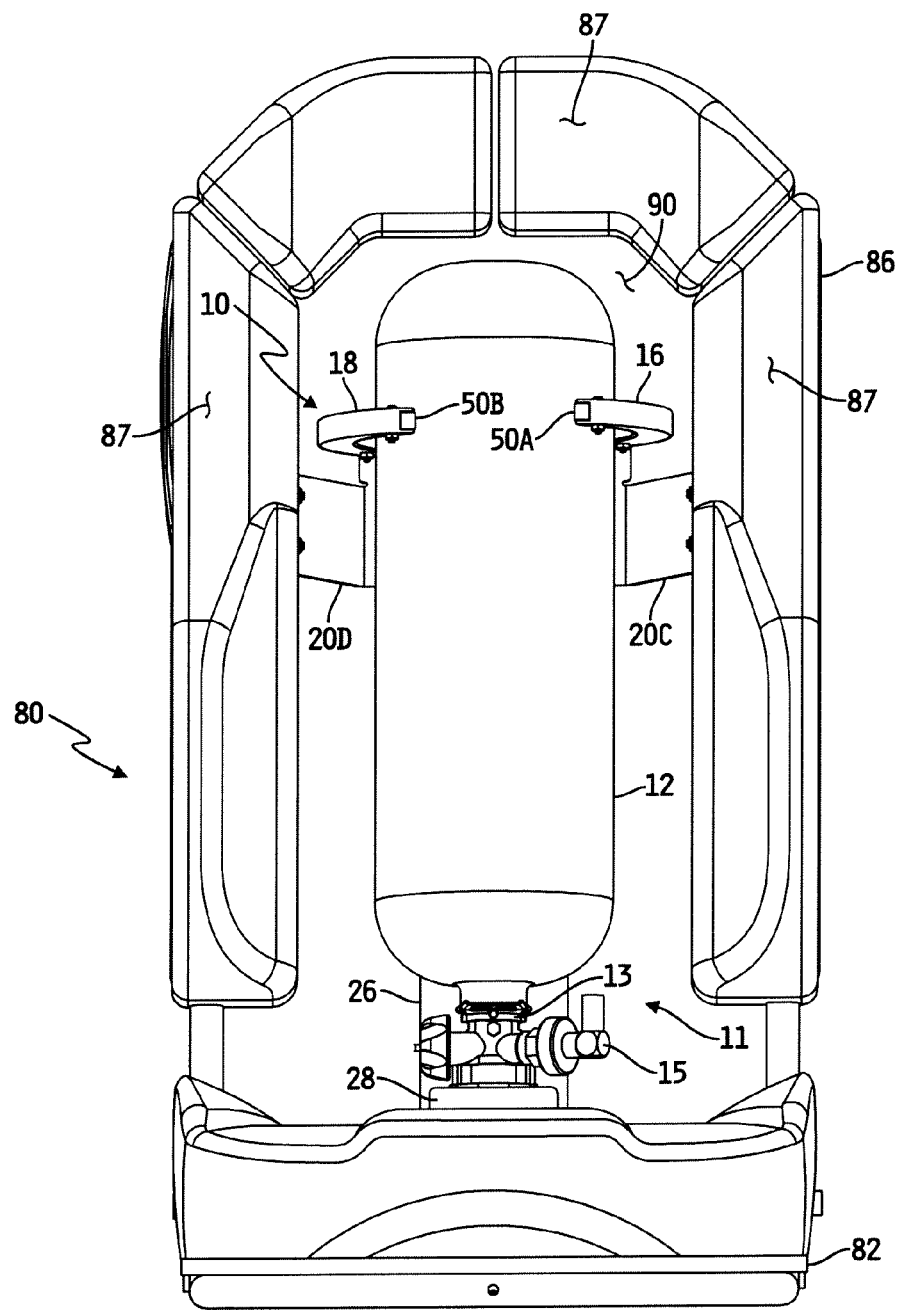
FIG. 5 is a front plan view of the combination illustrated in FIG. 4.

Referring now to FIGS. 4 and 5, the apparatus 10 of FIGS. 1-3 is shown mounted to a vehicle seat 80 that is secured to a vehicle 85. The vehicle seat 80 has a seat bottom 82 and a seat back 86 that are both mounted to a vehicle seat frame 84. The vehicle seat frame 84 is secured to the vehicle floor 88 in a conventional manner. In the illustrated embodiment, the seat back 86 defines a passageway 90 therethrough from a front surface 87 to a rear surface 89 thereof. The passageway 90 is sized to allow the frame 14 of the apparatus 10 to be mounted to the rear surface 89 of the seat back 86 with the SCBA 11 accessible from the front surface 87 via the passageway 90. In the illustrated embodiment, the frame mounting ears 22 and 24 are each secured in a conventional manner to the rear surface 87 of the seat back 86. While only the frame mounting ear 22 shown in FIG. 4, it will be understood that the frame mounting ear 24 is secured to the rear surface 89 of the seat back 86 in an identical manner. The lower frame member 26, in the embodiment illustrated in FIGS. 4 and 5, defines another frame mounting ear 27 at its free end. The frame mounting ear 27 is configured to be secured to the vehicle seat frame 84 as shown. It will be understood that while the frame 14 is illustrated in FIGS. 4 and 5 as being mounted to the seat back 86 and to the vehicle seat frame 84, it may alternatively be mounted only to the seat back 86, to the seat back 86 and to the seat bottom 82, to the seat back 86, seat bottom 82 and the vehicle seat frame 84, and/or to one or more additional support structures associated with the vehicle. In the illustrated embodiment, the SCBA 11 may be received through the passageway 90 in the seat back 86 and into engagement with the apparatus 10 as described hereinabove prior to transport by the vehicle 85. While the SCBA 11 is positioned within the apparatus 10 as illustrated in FIGS. 4 and 5, the apparatus 10 is configured to retain the cylinder 12 within the gripping arms 16 and 18 in the event of rapid deceleration of the vehicle 85 resulting from impact with another structure and in the event that the cylinder 12 is subject to gravitational forces such as when the vehicle 85 is traversing, or parked on, an inclined or declined surface, as will be described in greater detail hereinafter.

In the embodiment illustrated in FIGS. 4 and 5, the self-contained breathing apparatus 11 is of the type conventionally used by emergency personnel, and as such the vehicle 85 may be an emergency vehicle such as a fire truck or other emergency vehicle. It will be understood, however, that the subject disclosure contemplates configuring the apparatus 10 to restrain other objects and/or portions of other objects. Examples include, but are not limited to, other cylindrical objects such as air tanks for self-contained underwater breathing apparatuses (SCUBA), tanks containing other gases or gas combinations, tanks or bottles containing liquids, conventional fire extinguishers, or the like, objects having cylindrical portions, such as power or non-power tools, various sports equipment, or the like, and other elongated, but not necessarily cylindrical, objects. Vehicles that may carry such one or more other objects may accordingly include, but are not limited to, conventional motor vehicles, including military, commercial or privately-owned cars, trucks, buses, industrial machinery, utility vehicles, recreational vehicles (RV's), campers, and the like, military, commercial or privately owned aircraft or watercraft, single or multiple-track rail vehicles including trains, trams, trolleys, monorail transport systems, and the like.

In any such vehicle and/or for any such object, the subject disclosure contemplates embodiments of the apparatus 10 that have two or more sets of clamping arms 16, 18, and/or that may be mounted to the vehicle in any orientation. Examples include, but are not limited to, vertical applications including two or more sets of clamping arms 16, 18 and that may or may not include movable or fixed position top and/or bottom plates/support members to restrict vertical movement of the object, horizontal applications that include one or more sets of clamping arms 16, 18 and that may or may not include one or more movable or fixed position side plates to restrict horizontal movement of the object, and the like.

Figure 6:
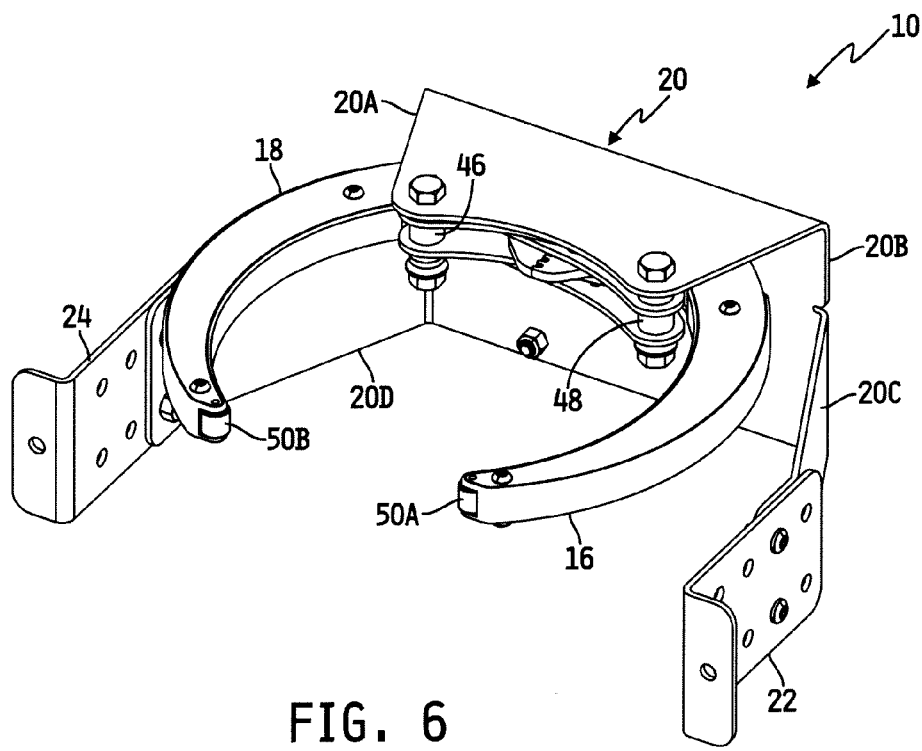
FIG. 6 is a front perspective view of the apparatus of FIGS. 1-3.

Referring now to FIG. 6, the gripping arms 16 and 18 are each movably mounted to the top plate 20A of the upper frame member 20. In the illustrated embodiment, the gripping arm 16 is generally arcuate in shape, and is pivotably mounted to the top plate 20A adjacent one end thereof via a conventional retaining pin 46. A conventional roller 50A is coupled to the free end of the gripping arm 16, and is configured to be freely rotatable relative to the gripping arm 16. The gripping arm 18 is likewise generally arcuate in shape, and is pivotably mounted to the top plate 20A adjacent one end thereof via another conventional retaining pin 48. Another conventional roller 50B is coupled to the free end of the gripping arm 18, and is configured to be freely rotatable relative to the gripping arm 18.

Figure 7:
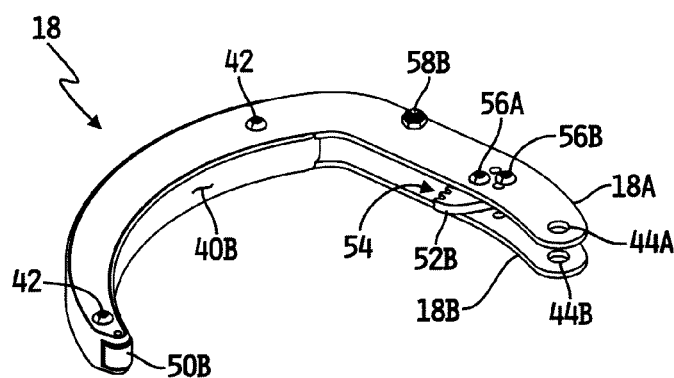
FIG. 7 is a perspective view of one of the gripping arms of the apparatus of FIG. 6.

Referring now to FIG. 7, one illustrative embodiment of the gripping arm 18 is shown. In the illustrated embodiment, the gripping arm 18 includes a pair of generally arcuate plates 18A and 18B and an arcuate-shaped mass 40B that is sized and configured to be sandwiched between the plates 18A and 18B. The conventional roller 50B is mounted between the plates 18A and 18B at the free end of the gripping arm 18, and the mass 40B extends away from the roller 50B and along an arcuate portion of the gripping arm 18 between the plates 18A and 18B. A number of conventional fastening elements 42 secure the two plates 18A and 18B together with the mass 40B sandwiched between the two. Juxtaposed bores 44A and 44B are defined through the plates 18A and 18B respectively, near the opposite ends of the plates 18A and 18B. The retaining pin 48 extends through the top plate 20A of the upper frame member 20 and through the bores 44A and 44B, to movably mount the gripping arm 18 to the upper frame member 20. The gripping arm 18 pivots about the retaining pin 48 relative to the upper frame member 20, and the retaining pin 48 thereby defines a pivot point of the gripping arm 18 relative to the upper frame member 20.

The gripping arm 18 further includes a guide member 52 that is mounted to the top plate 18A via conventional fastening elements 56A and 56B. The guide member 52 defines a number of teeth 54 on one surface thereof that are configured to engage like teeth of a guide member attached to the gripping arm 16 as will be described in greater detail hereinafter. The gripping arm 18 further includes another conventional fastening element 58B that not only secures the two plates 18A and 18B together, but that also forms a stop between the plates 18A and 18B for a biasing member that may be used to bias the gripping arm 18 to a default position relative to the upper frame member 20, as will be described in greater detail hereinafter. In the illustrated embodiment, the gripping arm 16 is configured identically as described with respect to the gripping arm 18 of FIG. 7, except that the gripping arm 16 is movably attached to the top plate 20A of the upper frame member 20 via the retaining pin 46.

Figure 8:
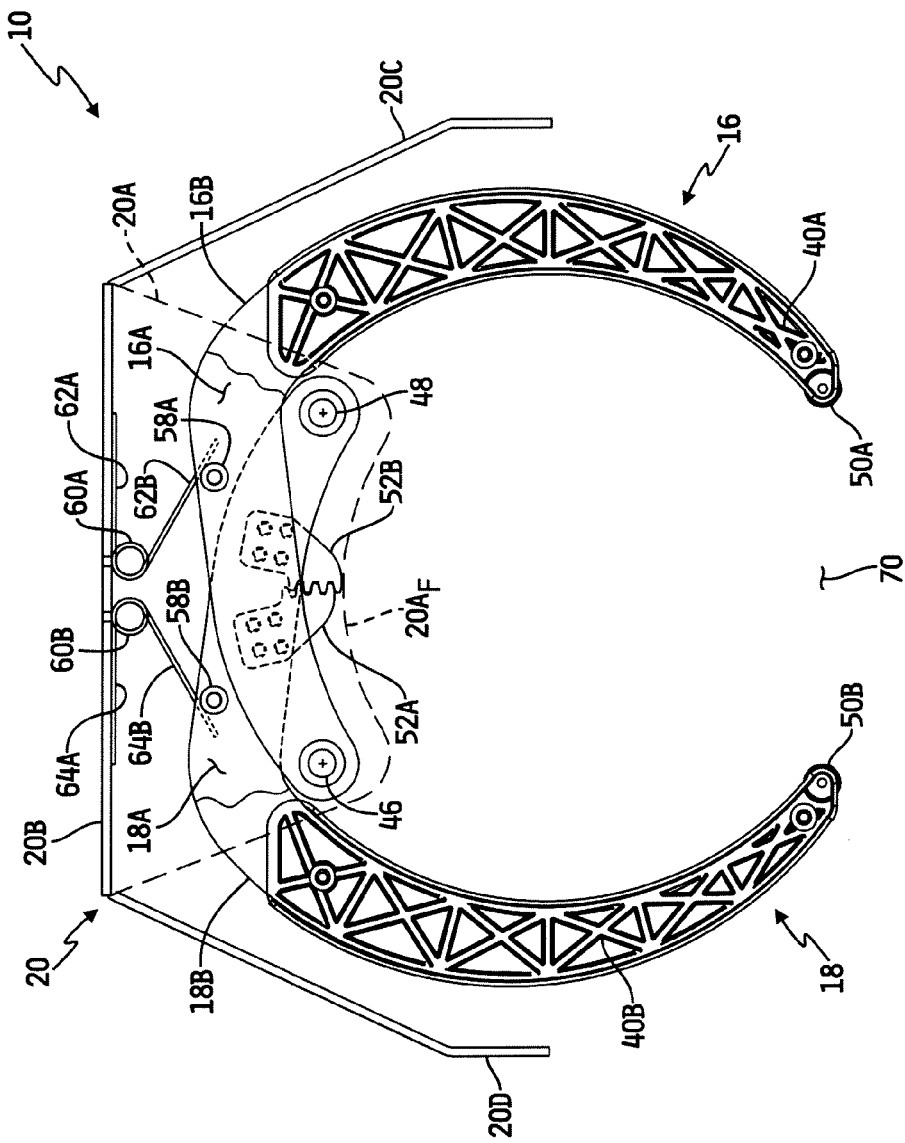
FIG. 8 is a top plan view of the apparatus of FIG. 6 shown in partial cutaway and partially in phantom.
Figure 9:
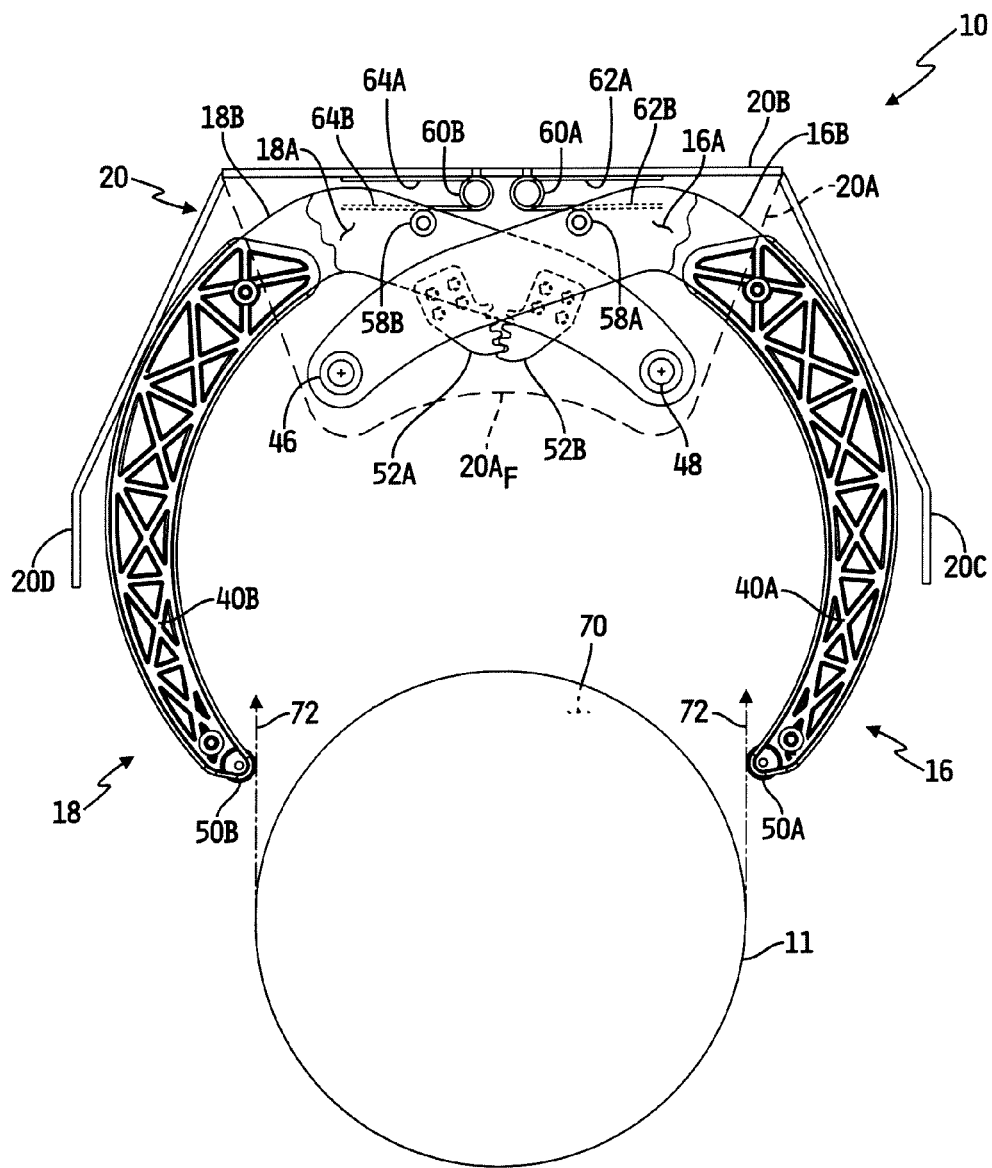
FIG. 9 is a top plan view similar to FIG. 8 but with the gripping arms forced open to receive an object therein.

Referring now to FIGS. 8 and 9, top plan views of the apparatus 10 of FIG. 6 are shown in partial cutaway and partially in phantom. More specifically, the top plate 20A of the upper frame member 20 is shown in phantom in FIGS. 8 and 9 to allow for the viewing of components that are otherwise hidden by the top plate 20A. Also, the top plates 16A and 18A of the gripping arms 16 and 18 respectively are shown in partial cutaway to illustrate placement of the masses 40A and 40B of the gripping arms 16 and 18 respectively.

In the embodiment illustrated in FIG. 8, the biasing members 60A and 60B are illustrated. More specifically, a biasing member 60A is disposed between the back plate 20B of the upper frame member 20 and the gripping arm 16, and a biasing member 60B is disposed between the back plate 20B of the upper frame member 20 and the gripping arm 18. The biasing members 60A and 60B are configured to apply biasing forces to the gripping arms 16 and 18 respectively that normally bias the free ends of the gripping arms 16 and 18 toward each other to form a mouth 70 between the two free ends. In the illustrated embodiment, the biasing members 60A and 60B are provided in the form of conventional torsional or coil springs having one leg 62A, 64A respectively in contact with the back plate 20B and another leg 62B, 64B respectively in contact with the fastening element 58A, 58B respectively between the plates 16A, 18A and 18B, 16B respectively. It will be appreciated, however, that the biasing members 60A and 60B may alternatively be provided in the form of linear springs, flat springs or other conventional biasing members.

Referring now to FIG. 9, the gripping arms 16 and 18 may be spread apart to receive the object 11 therein by forcing the object 11 into the mouth 70 of the gripping arms 16 and 18 in the direction indicated by the arrows 72. This action compresses the biasing members 60A and 60B as the free ends of the gripping arms 16 and 18 travel along the exterior of the object 11, which is facilitated by the rolling action of the rollers 50A and 50B. As the object advances into the mouth 70, the mouth 70 widens to accommodate the increasing diameter of the object 11. Eventually, the widest diameter portion of the object 11 will pass by the rollers 50A and 50B, and the free ends of the gripping arms 16 and 18 will begin to close around the object 11 as the object 11 is advanced further toward the top plate 20A of the upper frame member 20. When fully received within the gripping arms 16 and 18, the object 1 the object 11 will reside between the top plate 20A and the free ends of the gripping arms 16 and 18 as illustrated by example in FIGS. 1-4. The object 11 may be withdrawn from the apparatus 10 by reversing the above process under quasi-static conditions.

It is desirable in some embodiments of the apparatus 10 with cylindrical objects to maintain the object 11 centrally between the gripping arms 16 and 18. In this regard, the front face $20A_F$ of the top plate 20A has a concave contour that acts to urge a cylindrical object 11 disposed between the free ends of the gripping arms 16, 18 and the top plate 20A to be positioned centrally with respect to the top plate 20A and thus centrally with respect to the gripping arms 16, 18. The guide members 52A and 52B facilitate this by symmetrically guiding movement of the gripping arms 16, 18 as illustrated in FIGS. 8 and 9.

It should further be observed with respect to FIGS. 8 and 9 that the masses 40A and 40B extend from the free ends of the gripping arms 16 and 18 respectively, along the arcuate portions of the gripping arms 16, and 18, and terminate approximately at where the gripping arms 16 and 18 cross under the top plate 20A of the upper frame member 20. Such distribution of the masses 40A and 40B define, at least in part, centers of gravity of the gripping arms 16 and 18, and the centers of gravity of the gripping arms 16 and 18 relate directly to the gripping force of the gripping arms 16 and 18 as will be described in greater detail hereinafter.

A method of restraining an object 11 in a vehicle 85 may comprise providing first and second gripping arms 16, 18 each defining a free end as described hereinabove. The first and second gripping arms are then movably mounted to the frame 20 with the free ends of the gripping arms 16, 18 extending toward each other. The frame 20 may then be secured to the vehicle 85 as described hereinabove with respect to FIGS. 4-5. At least a portion of the object 11 may then be placed between the first and second gripping arms 16, 18 with the free ends thereof extending at least partially about the object 11. The first and second gripping arms 16, 18 are configured, as will be described hereinafter with respect to FIG. 10, such that a restraining force exerted by the first and second gripping arms 16, 18 on the object 11 is greater than or equal to an inertial force exerted by the object 11 on the first and second gripping arms 16, 18 so that the object 11 is retained between the first and second gripping arms 16, 18 under dynamic loading conditions.

Figure 10:
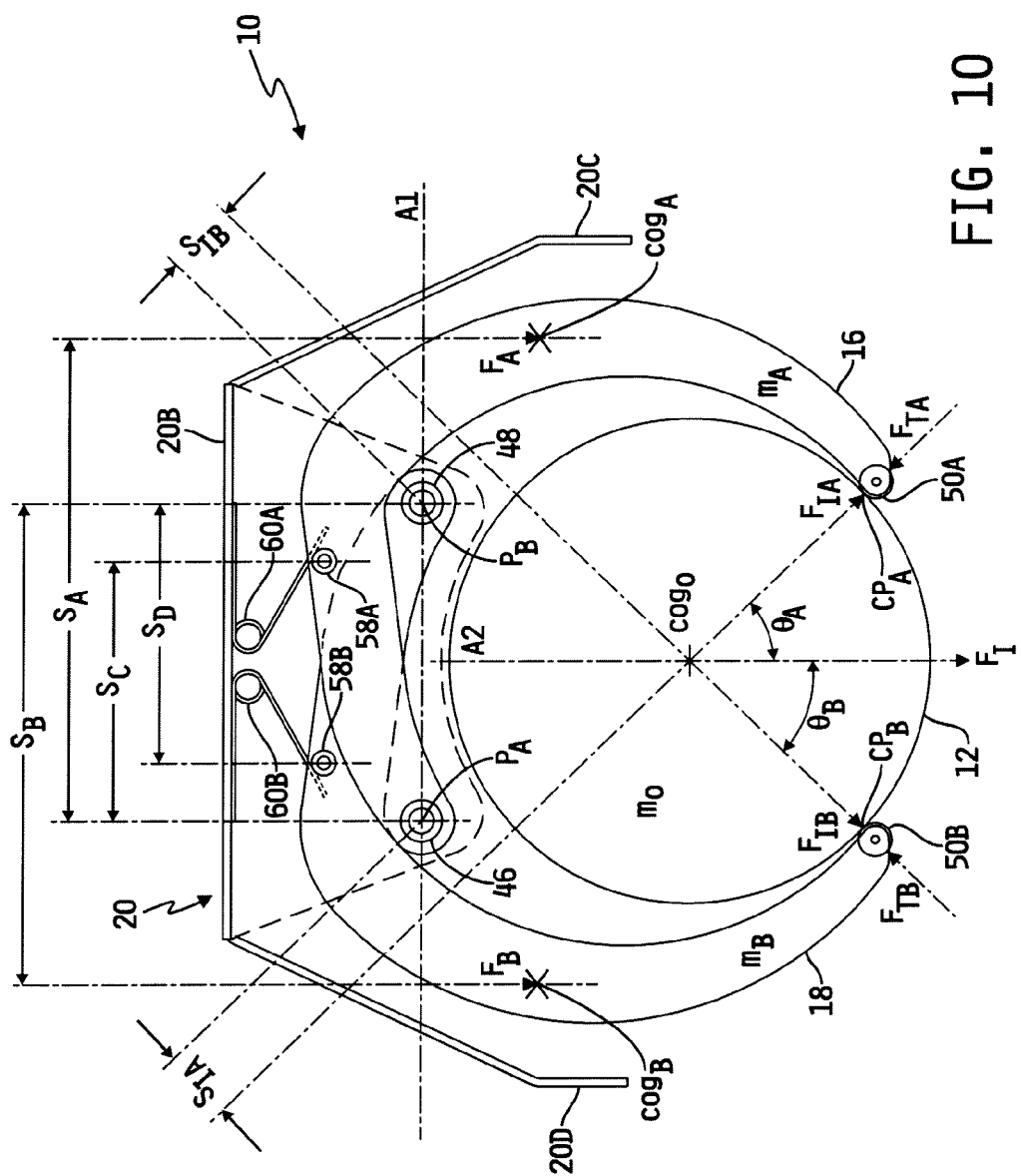
FIG. 10 is a top plan view similar to FIG. 8, with an object received within the gripping arms of the apparatus, illustrating various force vectors and moment arms involved in the operation of the apparatus.

Referring now to FIG. 10, the apparatus 10 is illustrated similarly to that of FIGS. 8 and 9. In FIG. 10, however, to facilitate an understanding of the operation of the apparatus 10 under dynamic loading conditions, the guide members 52A and 52B are omitted and a cylinder 12 portion of the object 11 is shown disposed between the free ends of the gripping arms 16 and 18 and the top plate 20A of the upper frame member 20. Under static conditions, the biasing members 60A and 60B bias the gripping arms 16, 18 forwardly relative to the upper frame member 20 so that the free ends of the gripping arms 16 and 18 extend at least partially about the cylinder 12 and toward each other.

The gripping arms 16 and 18 configured to exert a gripping force on the cylinder 12 that is directly proportional to any inertial force that may be exerted by the cylinder 12 on the gripping arms resulting from rapid deceleration of the vehicle 85 or from gravitational forces, so that the cylinder 12 is retained between the gripping arms 16, 18 and the top plate 20A of the upper frame member 20 during dynamic loading conditions. By properly selecting and distributing the masses 40A and 40B relative to the gripping arms 16 and 18 respectively, the gripping arms 16 and 18 will thus retain and maintain the cylinder 12 of the object 11 between the free ends of the gripping arms 16, 18 and the top plate 20A of the upper frame member 20 during full-frontal and oblique decelerations, such as may occur during vehicle impact events, and also when gravitational forces apply themselves to the apparatus 10, such as when parking on or traversing an incline or decline. Under dynamic loading conditions such as those just described, the gripping arms 16 and 18 provide significant torque about their rotational center and, if certain design criteria are met, counter the inertial loading of the heaviest of objects 11 for which the apparatus 10 is designed.

Referring to FIG. 10, a first axis, A1, is defined as one that passed through the pivot points $P_A$ and $P_B$, which are defined as the centers of the retaining pins 46 and 48 respectively. A second axis, A2, is defined as one that is perpendicular to the first axis A1, and that bisects a point on the axis A1 that equidistant from the pivot points $P_A$ and $P_B$. The second axis, A2, also passes through the center of gravity, $cog_O$, of the cylinder 12 when the cylinder 12 is positioned between the gripping arms 16 and 18 under normal, static conditions. An inertial force vector, $F_I$, applied in a direction away from the top plate 20A of the upper frame member 20 along the axis A2, such as would occur under a frontal vehicle impact event, may be represented as a force vector $F_{IA}$ that passes through the center of gravity, $cog_O$, of the object 11 and that is applied to the contact point, $CP_A$, between the cylinder 12 and the free end of the gripping arm 16. The force vector, $F_{IA}$, may be defined by the force vector equation:

$$F_{IA}=A*m_O*a*\sin e_A \qquad (1),$$

where A is the percentage of the total inertial force $F_I$ that is applied to the free end of the gripping arm 16 at the contact point $CP_A$, $m_O$ is the total mass of the object 11, "a" is the acceleration of the object 11 and $e_A$ is the angle, relative to the axis A2, that the force $F_{IA}$ is applied to the free end of the gripping arm 16. The free end of the gripping arm 16 applies a counter force, $F_A$, to the cylinder 12, which can be represented as a force vector applied through the center of gravity, $cog_A$, of the gripping arm 16 in a direction that is parallel to the inertial force vector, $F_I$, (i.e., perpendicular to the axis A1) and which is defined by the force vector equation:

$$F_A=m_A*a \qquad (2),$$

where $m_A$ is the mass of the gripping arm 16 and "a" is the acceleration of the gripping arm 16. The biasing member 60A exerts a biasing force on the gripping arm 16, which can be represented by a force vector, $F_C$, applied to the contact point 58A of the biasing member 60A with the gripping arm 16. $F_C$ is then defined by the equation:

$$F_C=L_A*K_A \qquad (3),$$

where $L_A$ is the pre-load length of the biasing member 60A and $K_A$ is the spring constant of the biasing member 60A.

In order to retain the cylinder 12 within the gripping arm 16 under dynamic loading conditions, the total force, $F_{TA}$, applied by the gripping arm 16 to the contact point, $CP_A$, in an opposite direction to $F_{IA}$, must satisfy the inequality:

$$F_{TA} \geq F_{IA} \qquad (4).$$

The force vector $F_{TA}$ may be expressed in terms of a sum of mass moments acting upon the contact point, $CP_A$, by the gripping arm 16 relative to the pivot point, $P_A$, which is given by the equation $(F_A*S_A)+(F_C+S_C)$, where $S_A$ is the length of the moment arm that extends perpendicularly between the force vector, $F_A$, and the pivot point, $P_A$, and $S_C$ is the length of the moment arm that extends perpendicularly between the force vector, $F_C$, and the pivot point, $P_A$. Likewise, the force vector, $F_{IA}$, may be expressed in terms of a mass moment acting upon contact point, $CP_A$, by the cylinder 12 relative to the pivot point, $P_A$, which is given by the equation $F_{IA}*S_{IA}$, where $S_{IA}$ is the length of the moment arm that extends perpendicularly between the force vector $F_{IA}$ and the pivot point, $P_A$. Substituting the mass moment expressions into the inequality (4) yields the expression:

$$(F_A*S_A)+(F_C*S_C) \geq F_{IA}*S_{IA} \qquad (5).$$

Substituting equations (1), (2) and (3) into the inequality (5) and canceling common acceleration terms then yields the inequality:

$$(m_A*S_A)+(L_A*K_A*S_C) \geq (A*m_O*S_{IA}*\sin e_A) \qquad (6).$$

Using a similar analysis for the gripping arm 18 yields the similar inequality:

$$(m_B * S_B) + (L_B * K_B * S_D) \geq (B * m_O * S_{IB} * \sin e_B) \quad (6).$$

It will be understood that the second term in equations (5) and (6) represent the forces applied to the gripping arms 16 and 18 respectively by the biasing members 60A and 60B respectively, and are typically small relative to the remaining terms. In some embodiments, the biasing members 60A and 60B may not be needed and may therefore be omitted. In any case, the inequalities (5) and (6) indicate that if the masses $m_A$ and $m_B$ are appropriately selected relative to the mass $m_O$, and the lengths of the moment arms $S_A$ and $S_B$ are appropriately selected relative to the moment arms $S_{IA}$ and $S_{IB}$, the gripping arms 16 and 18 will retain the cylinder 12 between the free ends of the gripping arms 16, 18 and the top plate 20A of the upper frame member 20 under dynamic loading conditions.

In the above analysis, the design criteria need not be applied identically to the gripping arms 16 and 18. However, if the above design criteria are applied equally to the gripping arms 16 and 18, A and B each become ½ and the inequalities (5) and (6) both reduce to the expression:

$$(m_{arm} * S_1) + (L * K * S_3) \geq (½ * m_O * S_2 * \sin e) \quad (7),$$

where $m_{arm}$ is the mass of either gripping arm 16, 18, $m_O$ is the mass of the object 11 of which the cylinder 12 forms a part, $S_1$ is the perpendicular distance between the pivot point $P_A$ and the force vector $F_A$ and/or the perpendicular distance between the pivot point $P_B$ and the force vector $F_B$, $S_2$ is the perpendicular distance between the pivot point $P_A$ and the force vector $F_{IA}$ and/or the perpendicular distance between the pivot point $P_B$ and the force vector $F_{IB}$, $S_3$ is the perpendicular distance between the pivot point $P_A$ and the force vector $F_C$ and/or the perpendicular distance between the pivot point $P_B$ and the force vector $F_D$, e is the angle between the axis A2 and either of the force vectors $F_{IA}$ and $F_{IB}$, L is the pre-load length of either biasing member 60A and 60B, and K is the spring constant of either biasing member 60A and 60B. Neglecting for simplicity the forces applied to the gripping arms by the biasing members 60A and 60B, the inequality (7) will hold true if the ratio of moment arms $(S_1/S_2 * \sin e)$ is greater than or equal to the ratio of the masses $m_O/m_{arm}$. In some embodiments, as described above, the biasing members 60A and 60B may be omitted so that the inequality (7) reduces to:

$$(m_{arm} * S_1) \geq (½ * m_O * S_2 * \sin e) \quad (8).$$

Figure 12:
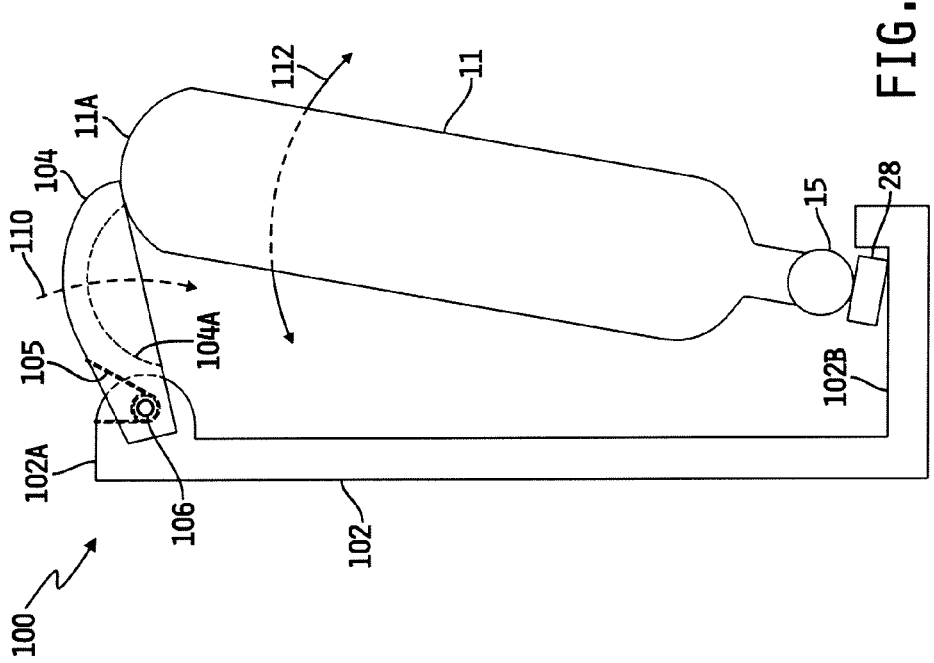
FIG. 12 is a side elevational view of the apparatus of FIG. 11 illustrating advancement of the object into, or removal of the object from, the apparatus.
Figure 11:
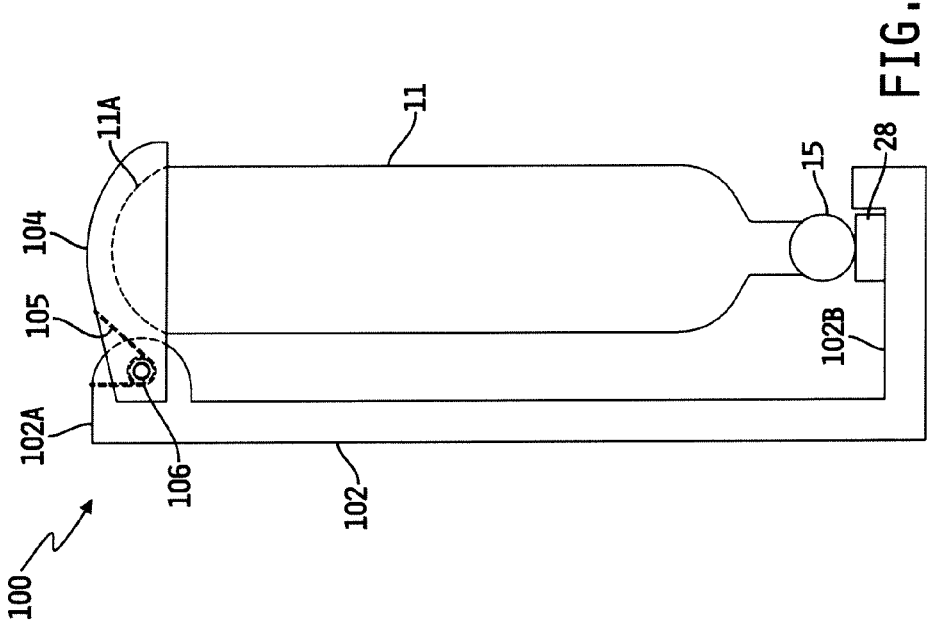
FIG. 11 is a side elevational view of another illustrative embodiment of an apparatus for restraining an object in a vehicle illustrated with an object retained therein.

Referring now to FIGS. 11 and 12, a side elevational view of another illustrative embodiment of an apparatus 100 for restraining an object 11 in a vehicle is shown. Illustratively, the object 11 is an elongated object such as a Self Contained Breathing Apparatus (SCBA) as illustrated and described above, although it will be understood that the object 11 may alternatively be or include other objects. In the illustrated embodiment, the apparatus 100 includes an elongated frame 102 having a first end 102A and a second end 102B opposite the first end 102A. The frame 102, like the frame 14 illustrated and described hereinabove, is configured to be mounted within a vehicle generally, and more specifically to at least a portion of a vehicle seat that is mounted within the vehicle. Referring to FIGS. 4 and 5 described hereinabove, an example vehicle seat 80 has a seat bottom 82 and a seat back 86, both of which are mounted to a vehicle seat frame 84 that is mounted within the vehicle. Illustratively, the frame 102 of the apparatus 100 is configured to be mounted to at least the seat back 86, and may be further configured to be also mounted to the vehicle seat frame 84 as illustrated in FIGS. 4 and 5.

Referring again to FIGS. 11 and 12, the apparatus 100 further includes a clamp member 104 that is movably mounted to the frame 102 at or near the end 102A of the frame 102. In the illustrated embodiment, the clamp member 104 is pivotably mounted to the frame 102 at or near the end 102A of the frame such that the clamp member 104 pivots about a pivot point 106 relative to the frame 102. The clamp member 104 illustrated in FIGS. 11 and 12 illustratively defines a recess 104A that is configured complementarily to the shape of the end 11A of the object 11 so that when the object 11 is positioned between the clamp member 104 and the end 102B of the frame 102, the end 11A of the object 11 is received within the recess 104A of the clamp member 104. The apparatus 100 further includes at least one biasing member 105 that is coupled between the frame 102 and the clamp member 104 and is configured to normally bias the clamp member 104 in the direction 110 (see FIG. 12) toward the end 102B of the frame 102. In the embodiment illustrated in FIGS. 11 and 12, the apparatus includes two such biasing members 105 (only one shown in FIGS. 11 and 12) in the form of conventional torsion springs, although it will be understood that the at least one biasing member 105 may alternatively provided in the form of more or fewer such torsion springs or may alternatively be provided in the form of one or more other conventional biasing members.

When the object 11 is positioned between the clamp member 104 and the end 102B of the frame 102, as illustrated in FIG. 11, the biasing force of the at least one biasing member 105 is sufficient to retain the object 11 between the clamp member 104 and the end 102B of the frame 102 under static conditions as shown. The clamp member 104 and the at least one biasing member 105 are further configured such that the clamp member 104 is responsive to a force applied thereto by one end 11A of the object 11 under quasi-static conditions to move upwardly against the bias of the at least one biasing member 105 to allow the object 11 to be received within, and to be removed from between, the clamp member 104 and the end 102B of the frame 102 as illustrated in FIG. 12. In the illustrated embodiment, the frame 102, the clamp member 104 and the at least one biasing member 105 thus cooperate to allow the object 11 to be received between, and to be removed from between, the clamp member 104 and the end 102B of the frame 102 simply by placing the support member 28 of the object 11 in contact with the end 102B of the frame 102, and then manually forcing the end 11A of the object 11 toward or away from the clamp member 104 in the direction of 112 as illustrated in FIG. 12. When the end 11A of the object 11 is forced in the direction 112 toward the frame 102 and against the clamp member 104 under quasi-static conditions, the downward force 110 of the one or more biasing members 105 is overcome and the clamp member 104 pivots upwardly to allow the end 11A of the object 11 to then be positioned within the recess 104A of the clamp member 104. With the object 11 positioned between the clamp member 104 and the end 102B of the frame 102, as illustrated in FIG. 11, and the end 11A may then forced in the direction 112 away from frame 102 under quasi-static conditions, in which case the downward force 110 of the one or more biasing members 105 may again be overcome so that the clamp member 104 pivots upwardly to allow the end 11A of the object 11 to be drawn away from, and out of, the apparatus 100, as illustrated in FIG. 12.

Figure 14:
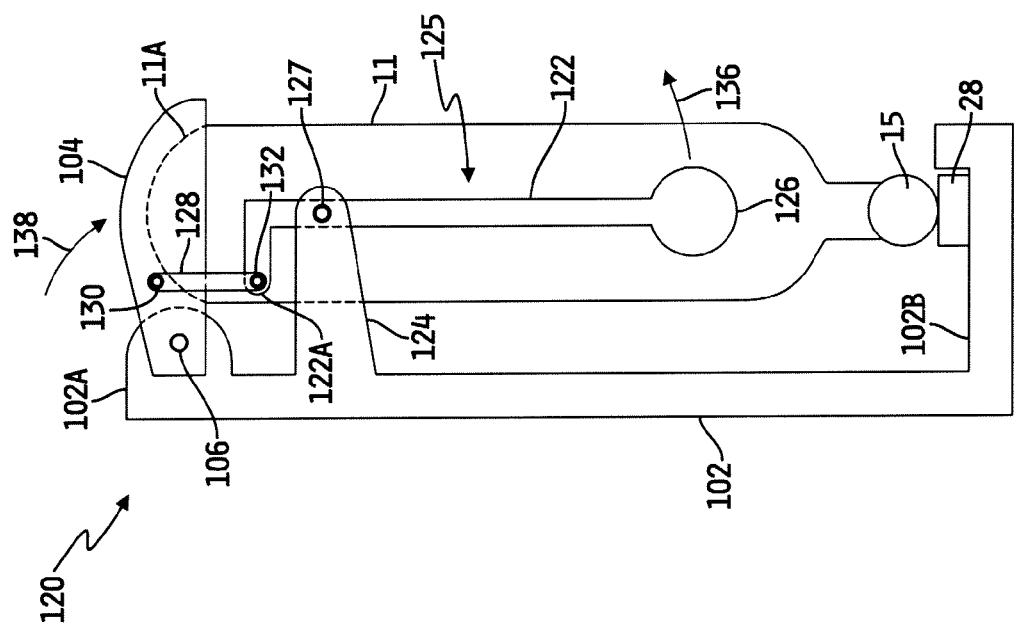
FIG. 14 is a side elevational view of the apparatus of FIGS. 13A and 13B illustrating operation of the additional object retaining structure under dynamic loading conditions.

Referring now to FIGS. 13A, 13B and 14, side elevational views of another embodiment 120 of the apparatus 100 of FIGS. 11 and 12 are shown that include one illustrative embodiment of an additional object retaining structure that ensures retention of the object 12 within the apparatus 120 under dynamic loading conditions. In the illustrated embodiment, the apparatus 120 includes all of the structure and functionality of the apparatus 100 illustrated and described with respect to FIGS. 11 and 12, and like numbers are therefore used to identify like components. In the embodiment illustrated in FIGS. 13A, 13B and 14, however, the at least one biasing member 105 is not shown so that other components of the apparatus 120 can be seen more clearly. The apparatus further includes an inertial member 125 that is movably mounted to the frame 102. The inertial member 125 includes an elongated lever 122 that defines a mass 126 at one end thereof. Illustratively, the apparatus 120 includes a bracket 124 that is integral with or rigidly secured to the frame 102, and that is movably mounted at an opposite end to the elongated lever 122. The lever 122 is movably mounted to the bracket 124 at a pivot point 127 such that the lever 122 pivots about the pivot point 127 relative to the bracket 124 and therefore relative to the frame 102.

The mass 126 may be attached to, or integral with, the one end of the lever 122. An opposite end 122A of the lever 122 is movably mounted to one end of a linkage member 128, and the opposite end of the linkage member 128 is movably mounted to the clamp member 104. Illustratively, the linkage member 128 is movably mounted to the clamp member 104 at a pivot point 130 and is movably mounted to the lever 122 at another pivot point 132.

The inertial member 125 is generally configured to move relative to the frame 102 and the clamp member 104 under quasi-static conditions and also under dynamic loading conditions, such as may occur during vehicle crash events, vehicle roll-over events, and the like. Under quasi-static conditions, as illustrated in FIG. 13A, for example, the clamp member 104 is responsive to a force applied thereto by one end 11A of the object 11 to move upwardly against the bias of the at least one biasing member as described hereinabove to allow the object 11 to be received within, and to be removed from between, the clamp member 104 and the end 102B of the frame 102 in the direction 134. When the object 11 is forced against the clamp member 104 in the direction toward the frame 102, as illustrated in FIG. 13A, the mass 126 moves toward the frame 102 so that the end 122A of the lever 122 advances upwardly toward the clamp member 104. This allows the clamp member 104 to move upwardly to receive the end 11A of the object 11 as described above. When the clamp member 104 is thereafter forced against the end 11A of the object 11 under the biasing force of the at least one biasing member 105, the lever 122 moves forward to an equilibrium position as illustrated in FIG. 13B. The object 11 may be removed from the apparatus 120 by reversing the process just described.

Under dynamic loading conditions in which inertial forces are directed outwardly from the frame 102 in the direction toward the object 11, the lever arm 122 and mass 126 attempt to move about the pivot point 127 in the direction 136, as shown in FIG. 14. Under these conditions, the mass 126 and lever 122 acting upon the clamp member 104 via the linkage member 128 exerts a retention force on the clamp member 104 in the direction 138 which, in addition to that exerted by the one or more biasing members 105, is sufficient to retain the object 11 between the clamp member 104 and the end 102B of the frame 102 under dynamic loading conditions.

Figure 15:
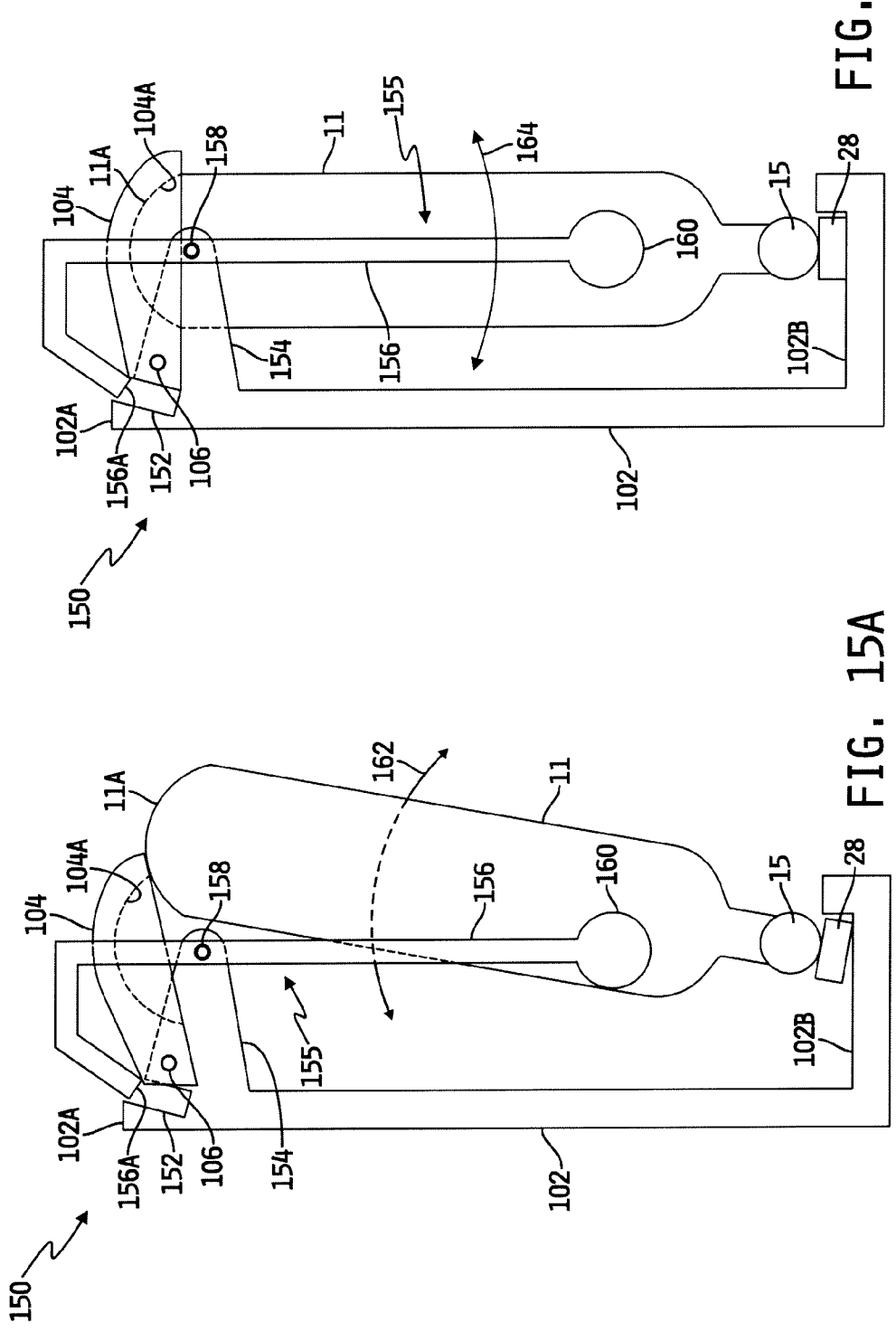
FIG. 15A is a side elevational view of the apparatus of FIGS. 11 and 12 shown with another illustrative embodiment of an additional object retaining structure that ensures retention of the object within the apparatus under dynamic loading conditions and shown illustrating advancement of the object into, or removal of the object from, the apparatus.
FIG. 15B is another side elevational view of the apparatus of FIG. 15A illustrated with the object retained therein.
Figure 16:
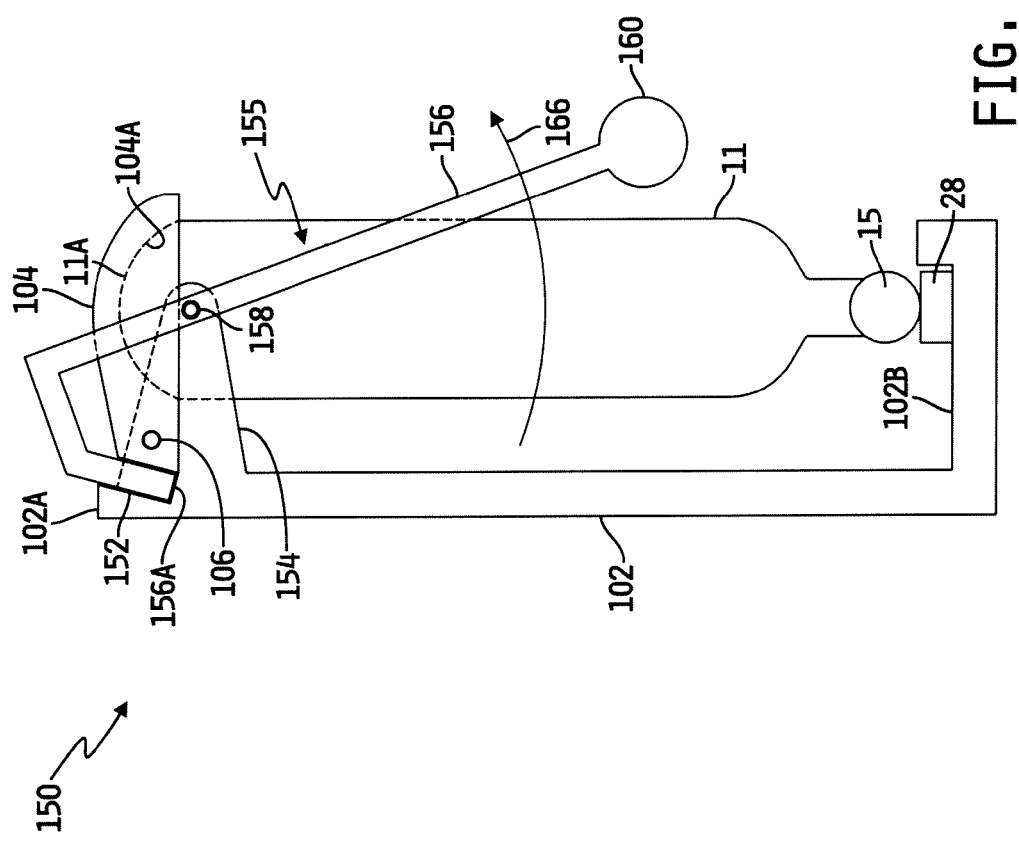
FIG. 16 is a side elevational view of the apparatus of FIGS. 15A and 15B illustrating operation of the additional object retaining structure under dynamic loading conditions.

Referring now to FIGS. 15A, 15B and 16, side elevational views of another embodiment 150 of the apparatus 100 of FIGS. 11 and 12 are shown that include another illustrative embodiment of an additional object retaining structure that ensures retention of the object 11 within the apparatus 150 under dynamic loading conditions. In the illustrated embodiment, the apparatus 150 includes all of the structure and functionality of the apparatus 100 illustrated and described with respect to FIGS. 11 and 12, and like numbers are therefore used to identify like components. In the embodiment illustrated in FIGS. 15A, 15B and 16, however, the at least one biasing member 105 is not shown so that other components of the apparatus 150 can be seen more clearly. In the illustrated embodiment, the end 102A of the frame 102 defines a channel 152 therein that is sized to receive therein an inertial member 155 in the form of a lever 156 that is movably attached or mounted to the frame 102. The apparatus 150 includes a bracket 154 that is rigidly secured to, or integral with, the frame 102, and that is movably mounted at an opposite end to the elongated lever 156. Illustratively, the lever 156 is movably mounted to the bracket 154 at a pivot point 158 such that the lever 156 pivots about the pivot point 158 relative to the bracket 154 and therefore relative to the frame 102. A mass 160 is formed at one end of the lever 156, and may be attached to, or integral with, the lever 156. The opposite end 156A of the lever 156 is sized to be received within the channel 152 under dynamic loading conditions as will be described in greater detail hereinafter.

Under quasi-static conditions, as illustrated in FIG. 15A, the clamp member 104 is responsive to a force applied thereto by one end 11A of the object 11 to move upwardly against the bias of the at least one biasing member as described hereinabove to allow the object 11 to be received within, and to be removed from between, the clamp member 104 and the end 102B of the frame 102 in the direction 162. Under static and quasi-static conditions, as illustrated in FIGS. 15B and 15A respectively, the end 156A of the lever 156 is positioned sufficiently away from, or outside of, the channel 152 such that the clamp member 104 may move upwardly about the pivot point 106 without being restricted in its movement by the end 156A of the lever 156. When the object 11 is forced against the clamp member 104 in the direction toward the frame 102 under quasi-static conditions, as illustrated in FIG. 15A, the clamp member 104 to moves upwardly to receive the end 11A of the object 11 as described above. The clamp member 104 is then forced against the end 11A of the object 11 under the biasing force of the at least one biasing member 105 such that the end 11A of the object is received within the recess 104A of the clamp member 104, as illustrated in FIG. 15B. The object 11 may be removed from the apparatus 150 by reversing the process just described.

The inertial member 155 is generally configured to move relative to the frame 102 and the clamp member 104 under dynamic loading conditions, such as may occur during vehicle crash events, vehicle roll-over events, and the like. For example, the lever 156 and mass 160 are configured to move, e.g., pivot, relative to the frame 102 about the pivot point 158 in the direction 164 as illustrated in FIG. 15B. Under dynamic loading conditions in which inertial forces are directed outwardly away from the frame 102 in the direction 166 toward the object 11, as illustrated in FIG. 16, the lever 156 and mass 160 move about the pivot point 158 in the direction 166 such that the end 156A of the lever 156 extends into the channel 152 and exerts a retention force on the clamp member 104 by inhibiting upward movement of the clamp member 104 relative to the end 102A of the frame 102. This retention force applied by the lever 156 to the clamp member 104 is sufficient to retain the object 11 between the clamp member 104 and the end 102B of the frame 102 under the dynamic loading conditions.

Figure 17A:
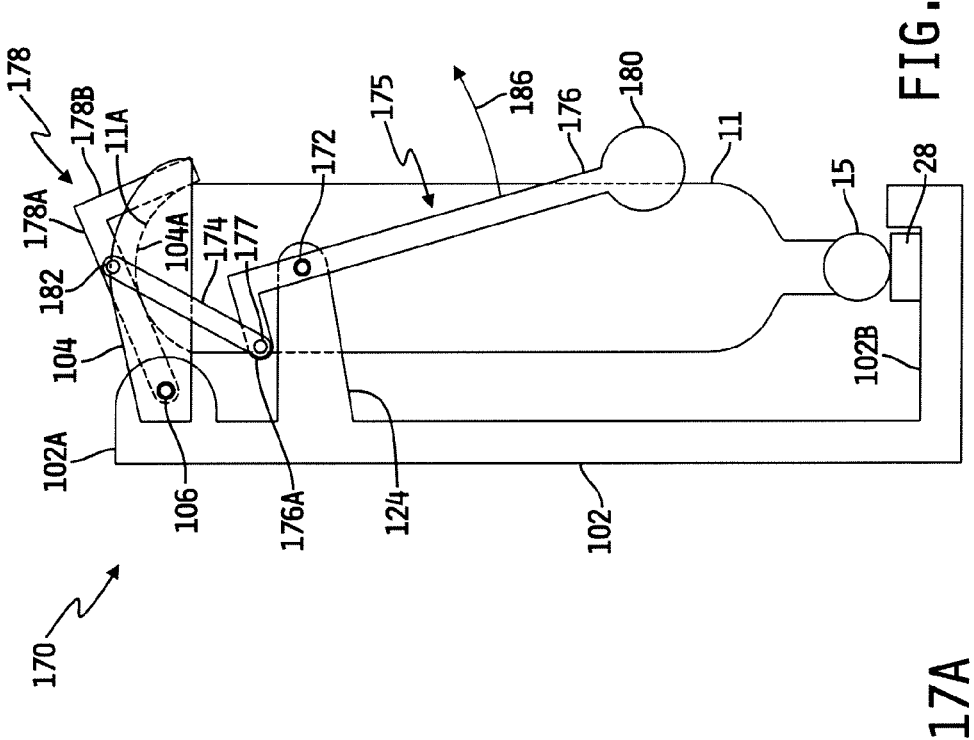
FIG. 17A is a side elevational view of the apparatus of FIGS. 11 and 12 shown with yet another illustrative embodiment of an additional object retaining structure that ensures retention of the object within the apparatus under dynamic loading conditions.
Figure 17B:
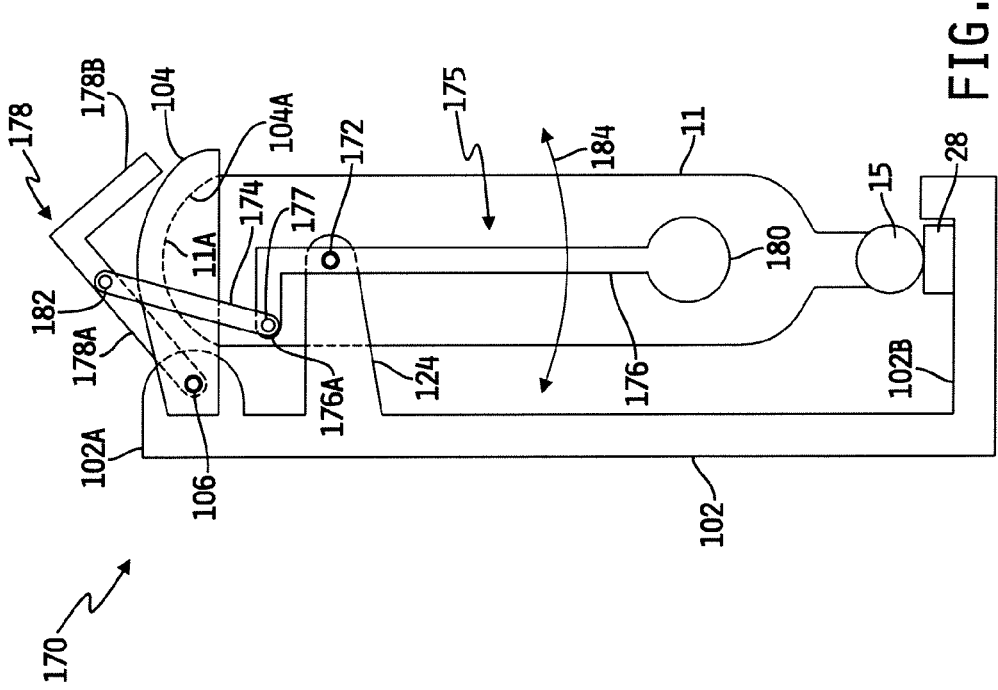
FIG. 17B is a side elevational view of the apparatus of FIG. 17A illustrating operation of the additional object retaining structure under dynamic loading conditions.

Referring now to FIGS. 17A and 17B, side elevational views of another embodiment 170 of the apparatus illustrated in FIGS. 11 and 12 is shown that includes yet another illustrative embodiment of additional object restraining structure that ensures retention of the object 11 within the apparatus 170 under dynamic loading conditions. In the illustrated embodiment, the apparatus 170 includes all of the structure and functionality of the apparatus 100 illustrated and described with respect to FIGS. 11 and 12, and like numbers are therefore used to identify like components. In the embodiment illustrated in FIGS. 17A and 17B, however, the at least one biasing member 105 is not shown so that other components of the apparatus 170 can be seen more clearly. In the illustrated embodiment, an inertial member 175 is provided in the form of an elongated lever 176 having one end 176A and an opposite end at which a mass 180 is formed. The mass 180 may be attached to, or integral with, the lever 176. A bracket 124 is rigidly secured to, or integral with, the frame 102, and the lever 176 is movably mounted to the bracket 124, and therefore movably mounted to the frame 102, between the end 176A of the lever 176 and the mass 180. Illustratively, the lever 176 pivots relative to the bracket 124 and relative to the frame 102 in the direction 184 as illustrated in FIG. 17A. The end 176A of the lever 176 is movably mounted to one end of a linkage member 174 having an opposite end that is movably mounted to a restraining member 178. Illustratively, the linkage member 174 is pivotably mounted to the end 176A of the lever 176 at a pivot point 177, and is also pivotably mounted to one leg 178A of the restraining member 178 at a pivot point 182. One end of the leg 178A is movably mounted to the frame 102 and/or clamp member 104, and another leg 178B of the restraining member 178 extends away from an opposite end of the leg 178A. Illustratively, the leg 178A of the restraining member 178 is pivotably mounted to the frame 102 and to the clamp member 102 at the pivot point 106, and the leg 178B of the restraining member 178 extends away from the leg 178A at a substantially right angle. It will be understood, however, that the end of the leg 178A may alternatively be movably mounted only to the frame 102 or only to the clamp member 104, and/or that the leg 178B may extend away from the leg 178A at an angle other than a substantially right angle.

Under quasi-static conditions, the clamp member 104 is responsive to a force applied thereto by one end 11A of the object 11 to move upwardly against the bias of the at least one biasing member as described hereinabove to allow the object 11 to be received within, and to be removed from between, the clamp member 104 and the end 102B of the frame 102 in the direction 184. Under static and quasi-static conditions, the former of which is illustrated in FIG. 17A, the restraining member 178 is positioned by the lever 176 to be sufficiently away from the top 11A of the object 11 such that it does not contact the object 11 and such that the clamp member 104 may move upwardly about the pivot point 106 without being restricted in its movement by the restraining member 178. When the object 11 is forced against the clamp member 104 in the direction toward the frame 102 under quasi-static conditions, the clamp member 104 to moves upwardly to receive the end 11A of the object 11 as described above. The clamp member 104 is then forced against the end 11A of the object 11 under the biasing force of the at least one biasing member 105 such that the end 11A of the object is received within the recess 104A of the clamp member 104. The object 11 may be removed from the apparatus 150 by reversing the process just described.

The inertial member 175 is generally configured to move relative to the frame 102 and the clamp member 104 under dynamic loading conditions, such as may occur during vehicle crash events, vehicle roll-over events, and the like. Under such dynamic loading conditions in which inertial forces are directed outwardly away from the frame 102 in the direction toward the object 12, the lever 176 and mass 180 move relative to the bracket 124, and therefore relative to the frame 102, along the direction of 186 as shown in FIG. 17B. This causes the end 176A of the lever 176 to be drawn downwardly away from the clamp member 104, which, in turn, draws the restraining member 178, via the linkage member 174, into engagement with the end 11A of the object 11. When this occurs, the restraining member 178 exerts a retention force on the object 11 that is sufficient to retain the object 11 between the clamp member 104 and the end 102B of the frame 102 under the dynamic loading conditions.

Referring now to FIGS. 18A and 18B, side elevational views of another embodiment 185 of the apparatus 100 of FIGS. 11 and 12 are shown that includes another illustrative embodiment of an additional object retaining structure that ensures retention of the object 11 within the apparatus 185 under dynamic loading conditions. In the illustrated embodiment, the apparatus 185 includes all of the structure and functionality of the apparatus 100 illustrated and described with respect to FIGS. 11 and 12, and like numbers are therefore used to identify like components. In the embodiment illustrated in FIGS. 18A and 18B, however, the at least one biasing member 105 is not shown so that other components of the apparatus 185 can be seen more clearly. In the illustrated embodiment, the apparatus 185 includes a movable bracket 186 having one end that is rigidly secured to the pivot point 106 and/or to the top clamp 104 so that the one end of the bracket 106 moves in response to movement of the top clamp 104 relative to the frame 102. In the illustrated embodiment, for example, the one end of the bracket 186 is rigidly secured to the pivot point 106 so that the bracket 186 rotates with the pivot point 106 as the top clamp is pivoted about the pivot point 106. The opposite end of the bracket 186 is configured to engage a conventional locking retractor 194 that is mounted to the frame 102. In the illustrated embodiment, for example, the opposite end of the bracket 186 defines a number of teeth 188 configured to engage similar teeth 190 defined on a rotating gear or wheel 192 forming part of the locking retractor 194. Together, the bracket 186 and the locking retractor 194 define an inertial member that is configured to move relative to the frame 102 and/or clamp member 104 under dynamic loading conditions to exert a retention force on the clamp member 104 that is sufficient to retain the object 11 between the clamp member 104 and the end 102B of the frame 102 under the dynamic loading conditions.

Illustratively, the locking retractor 194 is responsive to at least one of acceleration thereof that is greater than an acceleration threshold and rotational speed of movement of the locking retractor 194 that is greater than a threshold speed to exert the retention force on the clamp member 104 via the bracket 186. In one embodiment, for example, the locking retractor 194 may be a conventional retractor that is configured to prevent the gear or wheel 190 from further rotational movement when the retractor 194 experiences a deceleration (i.e., negative acceleration) that is greater than a predefined deceleration threshold (i.e., that is greater in magnitude than a negative acceleration threshold). Alternatively, the locking retractor 194 may be a conventional retractor that is configured to prevent further rotation of the gear or wheel 192 when the gear or wheel 192 rotates faster than a predefined threshold rotational speed. Alternatively still, the locking retractor 194 may be a conventional retractor that is configured to prevent further rotation of the gear or wheel 192 when either the retractor 194 experiences a deceleration that is greater than a predefined deceleration threshold or the gear or wheel 192 is rotating faster than a predefined threshold rotational speed.

The inertial member 194 and the bracket 186 are generally configured to move relative to the frame 102 and the clamp member 104 under quasi-static conditions and also under dynamic loading conditions, such as may occur during vehicle crash events, vehicle roll-over events, and the like. Under quasi-static conditions, as illustrated in FIG. 18A, for example, the clamp member 104 is responsive to a force applied thereto by one end 11A of the object 11 to move upwardly against the bias of the at least one biasing member as described hereinabove to allow the object 11 to be received within, and to be removed from between, the clamp member 104 and the end 102B of the frame 102 in the direction 196. For example, when the object 11 is forced against the clamp member 104 in the direction toward the frame 102 under quasi-static conditions, as illustrated in FIG. 18A, the clamp member 104 to moves upwardly to receive the end 11A of the object 11 as described above. The clamp member 104 is then forced against the end 11A of the object 11 under the biasing force of the at least one biasing member 105 such that the end 11A of the object is received within the recess 104A of the clamp member 104, as illustrated in FIG. 18B. The object 11 may be removed from the apparatus 150 by reversing the process just described.

Under dynamic loading conditions in which inertial forces are directed outwardly away from the frame 102 in the direction 198 generally toward the object 11, as illustrated in FIG. 18B, the gear or wheel 192 locks when the deceleration experienced by the inertial member 194 becomes greater than a predefined deceleration threshold (e.g., when the acceleration experienced by the inertial member 194 falls below a predefined negative acceleration threshold) and/or when the rotational speed of the gear or wheel 192 becomes greater than a predefined rotational speed threshold. Because the teeth 190 of the gear or wheel 192 are engaged with the teeth 188 of the bracket 186, locking of the gear or wheel 192 likewise locks the bracket 186 from further movement relative to the inertial member 194. Because the bracket 186 is rigidly secured to the pivot point 106, locking of the bracket 186 relative to the inertial member 194 thus applies a retention force to the clamp member 104 via the pivot point 106, which causes the bracket 186 to lock the position of the clamp member 104 relative to the frame 102. In other words, locking of the bracket 186 relative to the inertial member 194 locks the pivot point 106 from further movement relative to the frame 102, and thus locks the clamp member 104 to the frame 102. This, then, prevents movement of the clamp member 104 relative to the frame 102. The retention force applied by the inertial member 194 to the clamp member 104, as just described, is sufficient to retain the object 11 between the clamp member 104 and the end 102B of the frame 102 under the dynamic loading conditions.

Figure 19:
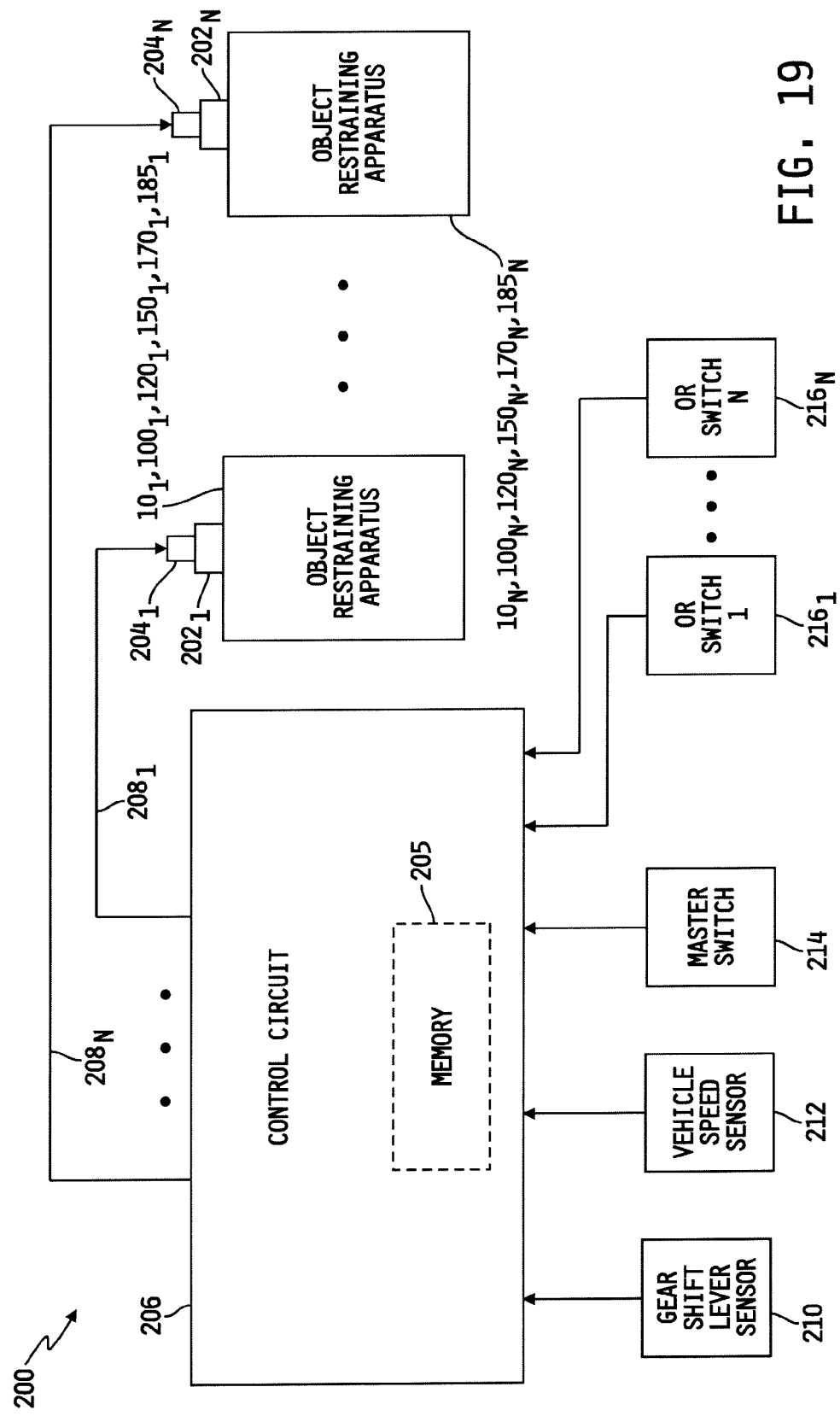
FIG. 19 is a block diagram of an electronic system for dynamically controlling the operation of one or more locks associated with a corresponding one or more apparatuses for restraining an object in a vehicle.

Referring now to FIG. 19, a block diagram is shown of an electronic system 200 for automatically controlling the operation of one or more locks associated with a corresponding one or more apparatuses for restraining an object in a vehicle. In the illustrated embodiment, the system 200 includes a number, N, of object restraining apparatuses $10_1$-$10_N$, $100_1$-$100_N$, $120_1$-$120_N$, $150_1$-$150_N$, or $170_1$-$170_N$, wherein N may be any positive integer. The number, N, of object restraining apparatuses may be provided in the form of any one or a combination of the apparatuses $10_1$-$10_N$, $100_1$-$100_N$, $120_1$-$120_N$, $150_1$-$150_N$, and/or $170_1$-$170_N$ illustrated and described herein, or may alternatively be provided in the form of one or more other conventional apparatuses configured to restrain objects, such the objects 12 illustrated herein. In any case, each of the object restraining apparatuses includes a lock, $202_1$-$202_N$, associated therewith, and an actuator, $204_1$-$204_N$. Each of the actuators $204_1$-$204_N$ is responsive to one control signal to activate an associated one of the locks $202_1$-$202_N$ of a corresponding one of the object restraining apparatuses, and is responsive to another control signal to deactivate a corresponding one of the locks $202_1$-$202_N$ of the associated object restraining apparatus. Illustratively, the locks $202_1$-$202_N$ and the actuators $204_1$-$204_N$ may each be conventional, and may or may not be combined into single lock/actuators. An example of one such combination lock/actuator includes, but is not limited to, a conventional electrically actuated solenoid wherein the solenoid plunger acts as the lock. In any case, each of the locks $202_1$-$202_N$ may be activated by a corresponding one of the actuators $204_1$-$204_N$ to lock an object restraining structure of a corresponding one of the one or more object restraining apparatuses. For example, in embodiments in which the one or more object restraining apparatuses include one or more of the apparatuses 10 illustrated and described herein, a corresponding one of the one or more of the locks $202_1$-$202_N$ may be configured to lock one or both of the gripping arms 16, 18 to the upper frame member 20 or to otherwise inhibit movement, e.g., opening or spreading, of the gripping arms 16 and 18 under specified conditions.

Figure 20:
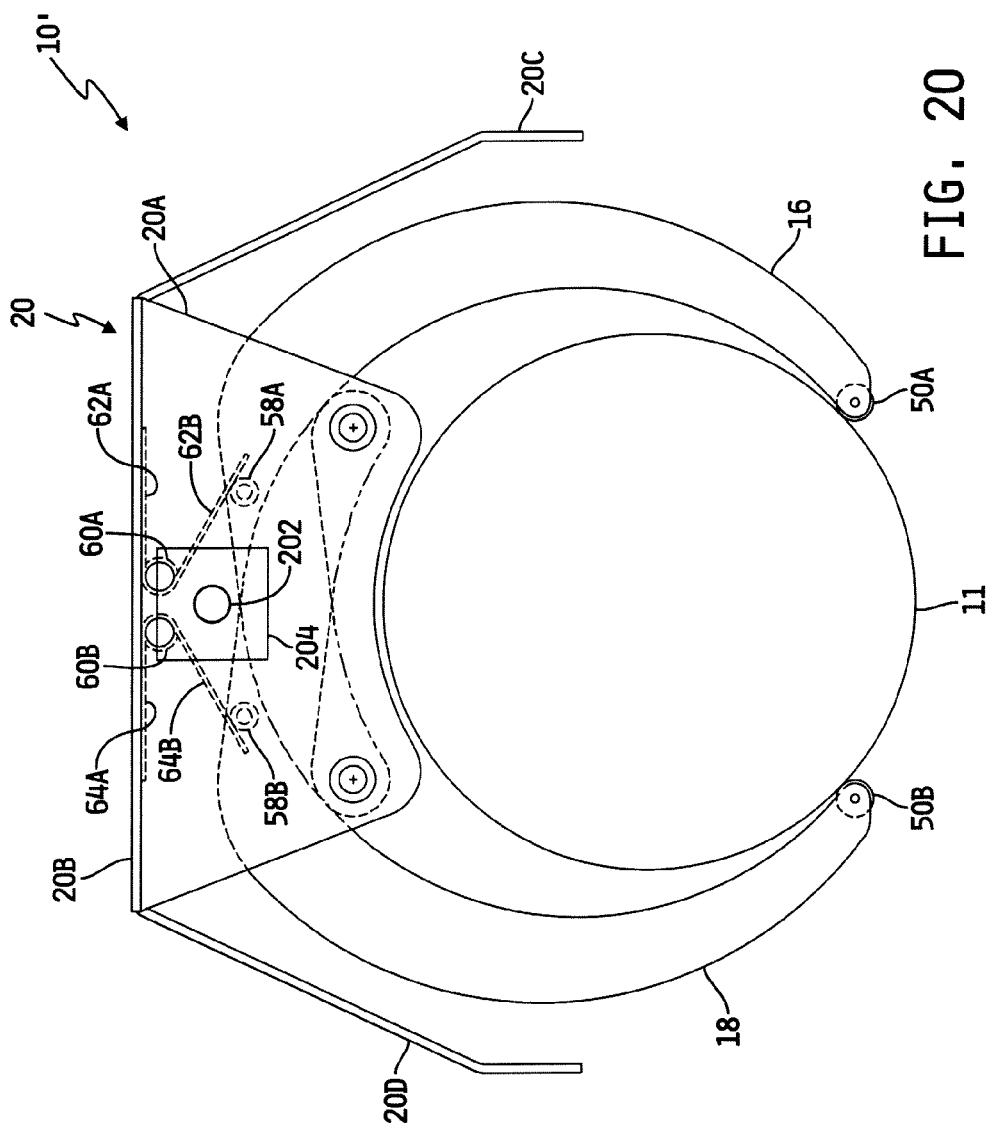
FIG. 20 is a top plan view of another illustrative embodiment of the object restraining apparatus of FIGS. 1-10 shown equipped with an electrically actuated object locking feature.
Figure 21:
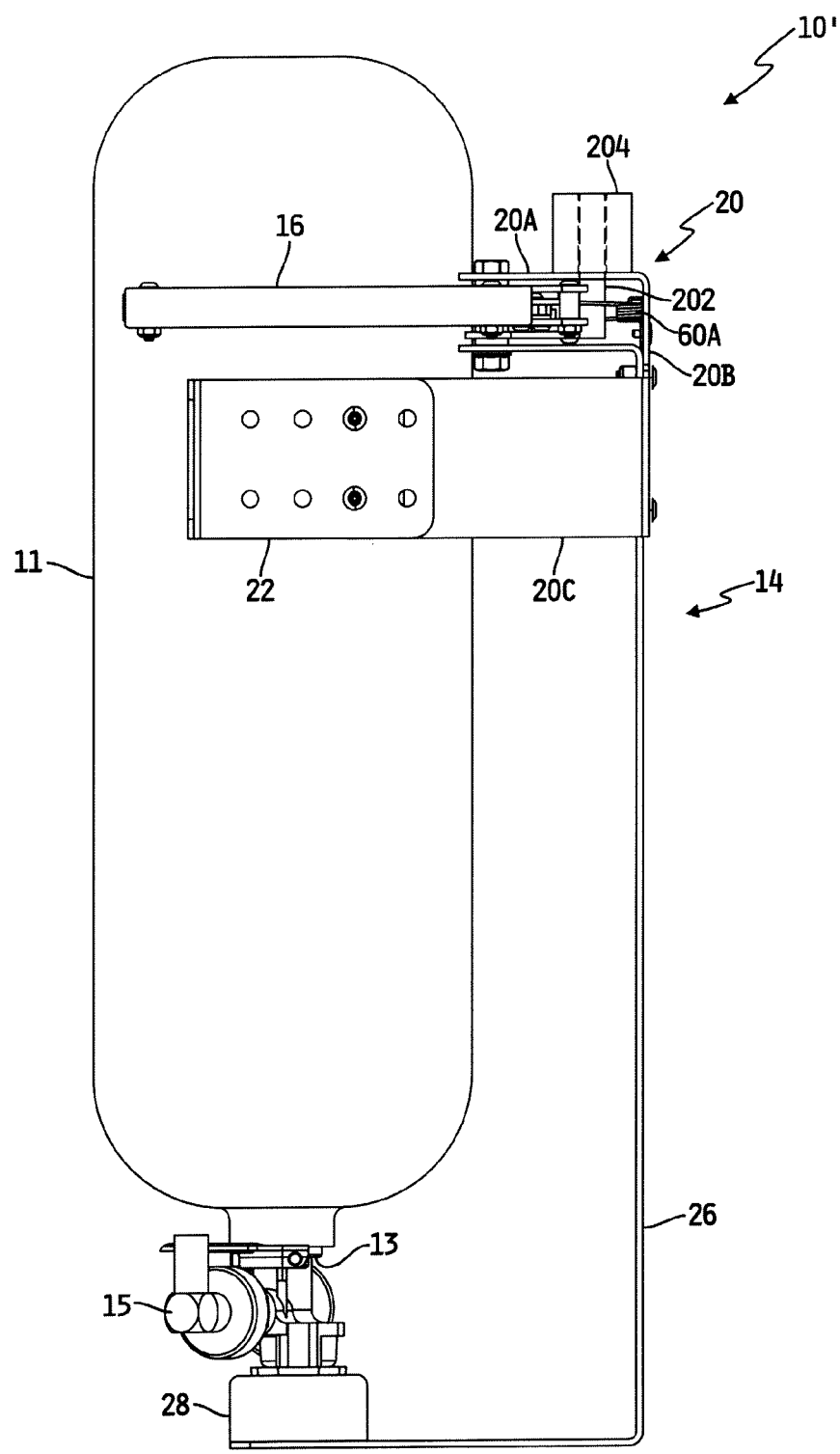
FIG. 21 is a side elevational view of the embodiment illustrated in FIG. 20 with the electrically actuated object locking feature shown in a locked position.
Figure 22:
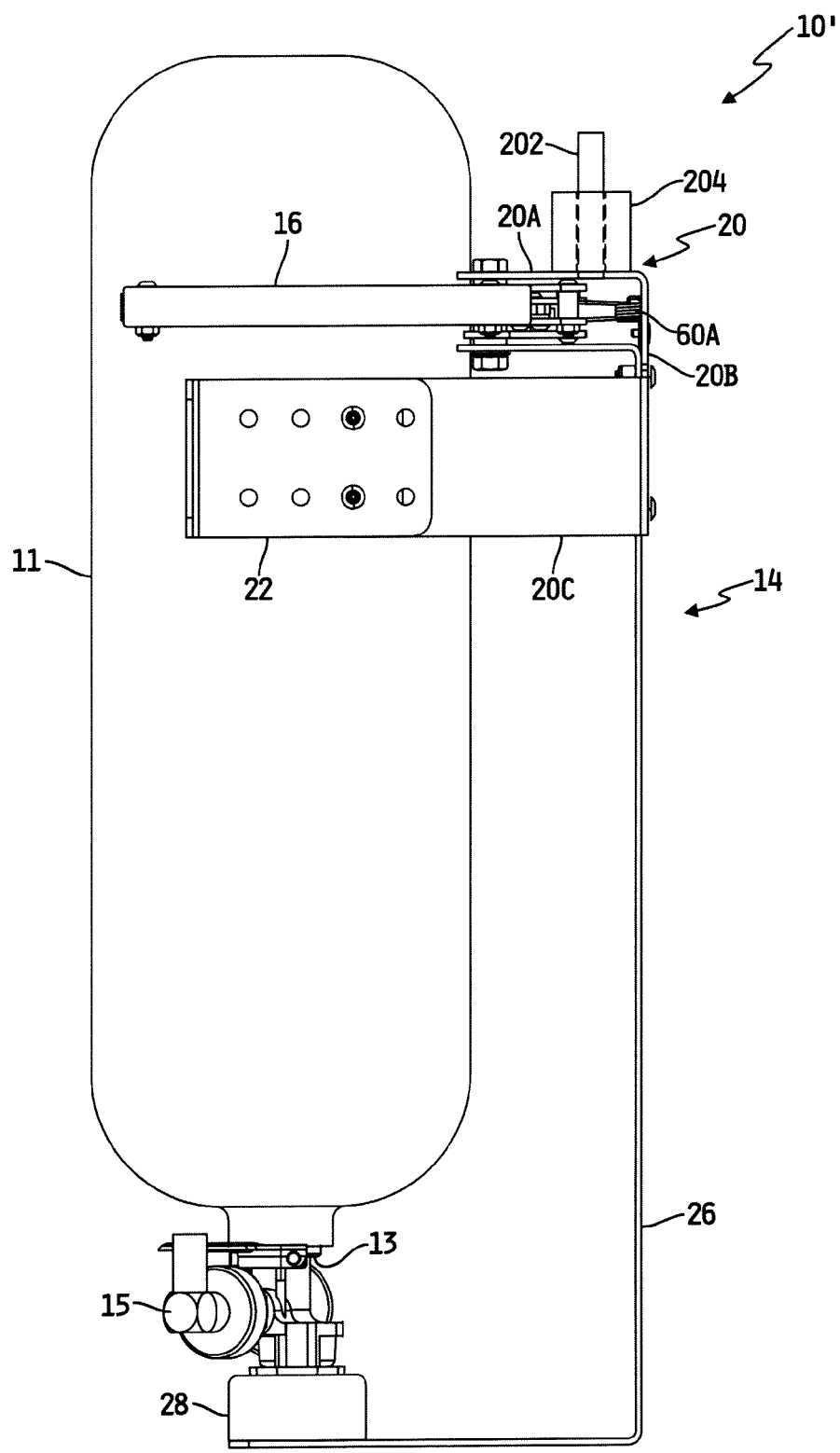
FIG. 22 is a side elevational view of the embodiment illustrated in FIG. 20 with the electrically actuated object locking feature shown in an unlocked position.

Referring to FIGS. 20-22, for example, another illustrative embodiment of an object restraining apparatus 10' is shown that is identical in structure and function to the apparatus 10 illustrated and described with respect to FIGS. 1-10 with the exception that the apparatus 10' includes an electrically actuated solenoid 204 having a plunger 202 that acts as the object restraining apparatus lock. In the illustrated embodiment, the solenoid 204 is mounted to the top plate 20A of the upper frame member 20 and positioned relative to the gripping arms 16 and 18 such that the solenoid plunger 202 may extend, when activated, downwardly such that it resides generally between the gripping arms 16/18 and the back plate 20B of the upper frame member 20, and more specifically resides adjacent to the gripping arms 16/18. The solenoid 204 is responsive to one control signal to activate the lock by extending the plunger 202 downwardly, as illustrated in FIG. 21, to block or otherwise inhibit rearward movement of the gripping arms 16/18 so that the gripping arms 16/18 cannot open as illustrated in FIG. 9. The plunger 202 of the activated solenoid 204 thus blocks movement of the gripping arms 16/18 so that the object 11 is maintained between the gripping arms 16/18. The solenoid is responsive to another control signal to deactivate the lock by drawing the plunger 202 upwardly, as illustrated in FIG. 22, so that rearward movement of the gripping arms 16/18, as illustrated in FIG. 9, is not blocked or otherwise impeded by the solenoid plunger 202.

As another example, in embodiments in which the one or more object restraining apparatus include one or more of the apparatuses 100, 120, 150 or 170 illustrated and described herein, a corresponding one of the one or more of the locks $202_1$-$202_N$ may be configured to lock the clamp member 104 to the frame 102 and/or bracket 124/154.

Figure 24:
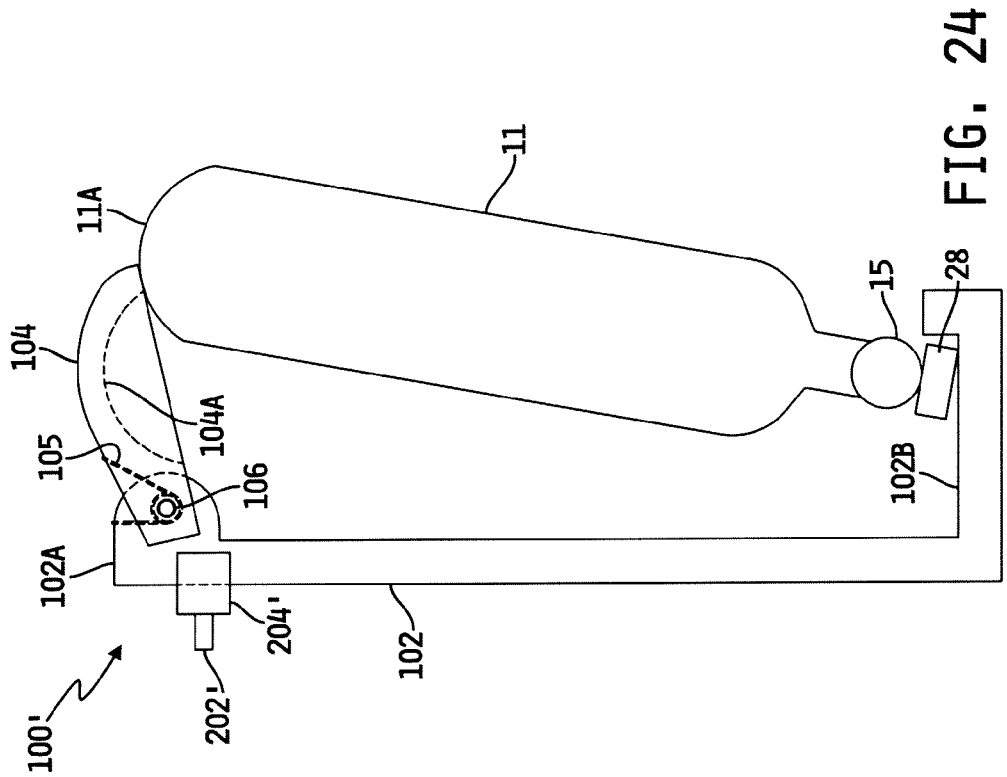
FIG. 24 is a side elevational view of the embodiment illustrated in FIG. 23 with the electrically actuated object locking feature shown in an unlocked position.
Figure 23:
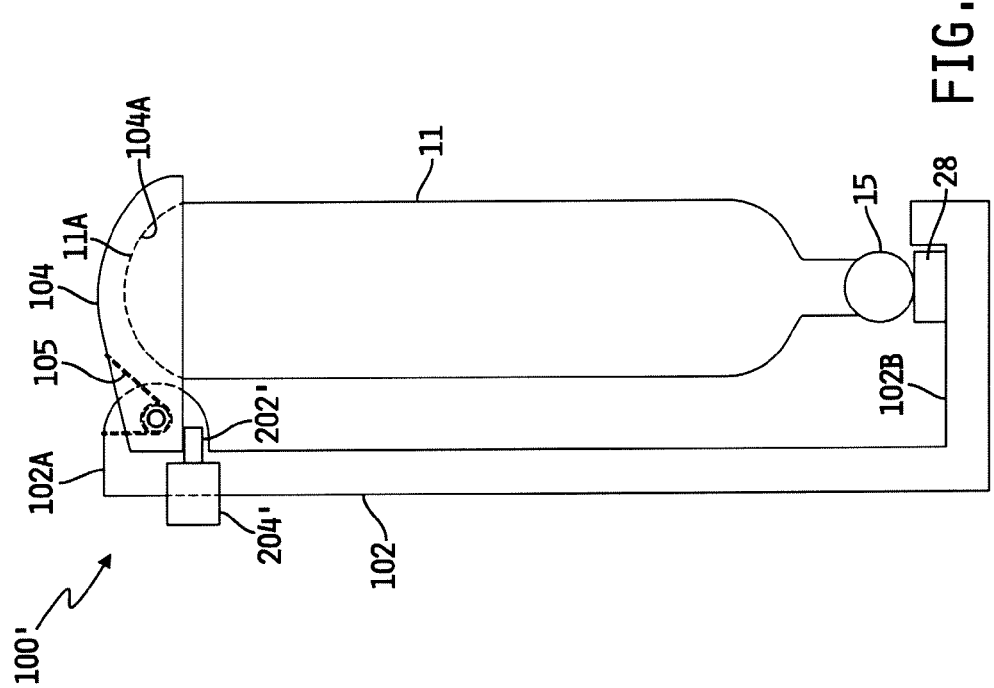
FIG. 23 is a side elevational view of another illustrative embodiment of the object restraining apparatus of FIGS. 11-12 equipped with an electrically actuated object locking feature illustrated in a locked position.
Figure 25:
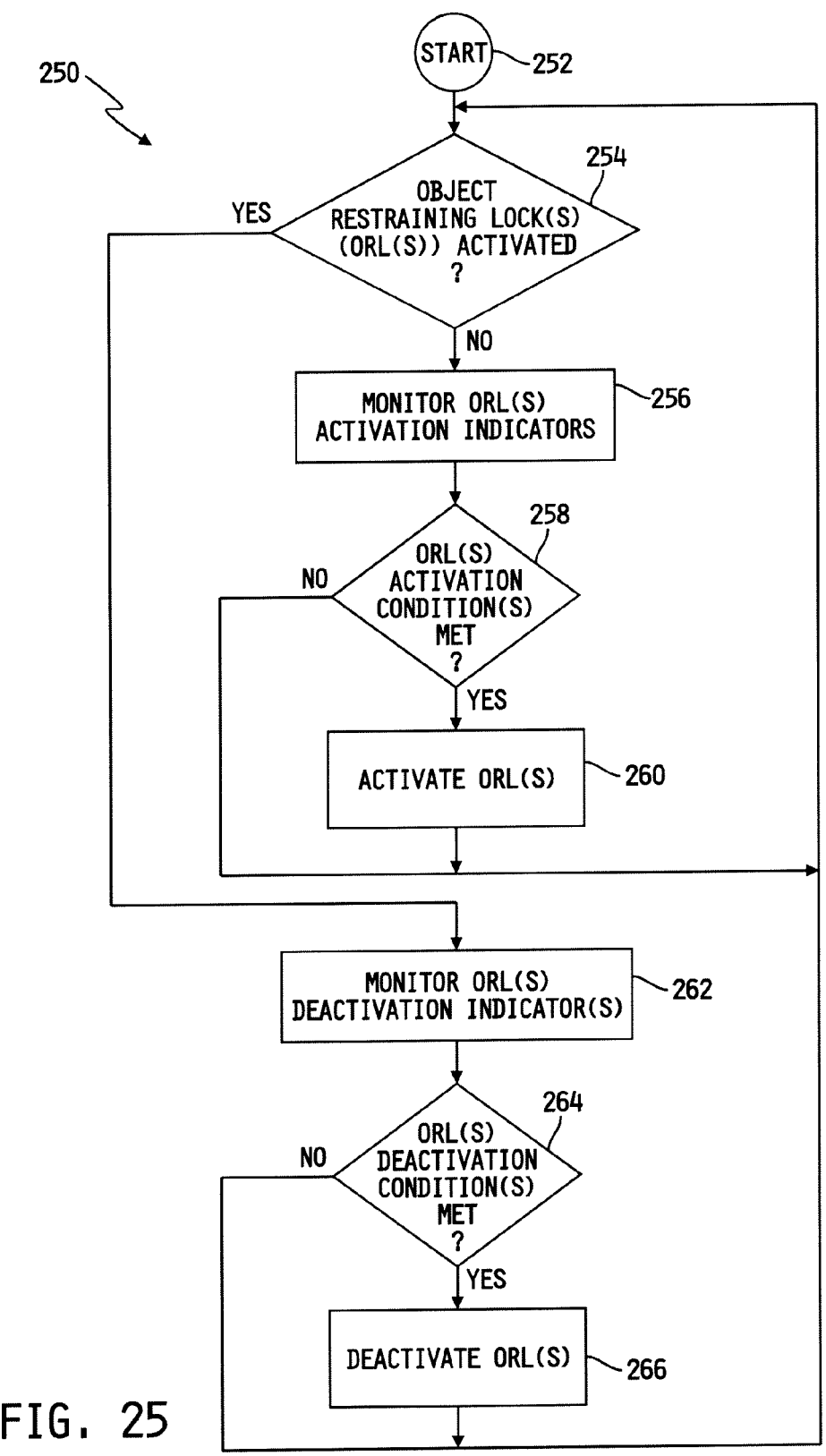
FIG. 25 is a flowchart illustrating one illustrative embodiment of a process, executable by the system of FIG. 19, to dynamically control operation of the one or more locks associated with the corresponding one or more apparatuses for restraining an object in a vehicle.

Referring to FIGS. 23-24, for example, another illustrative embodiment of an object restraining apparatus 100' is shown that is identical in structure and function to the apparatus 100 illustrated and described with respect to FIGS. 11-12 with the exception that the apparatus 100' includes an electrically actuated solenoid 204' having a plunger 202' that acts as the object restraining apparatus lock. In the illustrated embodiment, the solenoid 204 is mounted to the frame 102 of the apparatus 100' and positioned relative to the clamp member 104 such that the solenoid plunger 202' may extend, when activated, laterally under the clamp member 104 such that it blocks or otherwise impedes upward movement of the clamp member 104. The solenoid 204' is responsive to one control signal to activate the lock by extending the plunger 202' laterally, as illustrated in FIG. 23, to block or otherwise inhibit upward movement of the clamp member 104 so that the object 11 cannot be withdrawn from the apparatus 100' as illustrated in FIG. 12. The plunger 202' of the activated solenoid 204' thus blocks movement of the clamp member 104 so that the object 11 is maintained between the clamp member 104 and the end 102B of the frame 102. The solenoid 204' is responsive to another control signal to deactivate the lock by drawing the plunger 202' back toward the solenoid 204', as illustrated in FIG. 24, so that upward movement of the clamp member 104 is not blocked or otherwise impeded by the solenoid plunger 202' as shown.

In embodiments that include other conventional object restraining apparatuses, one or more conventional locks may be used to lock one or more of the actual object retaining or restraining structures to a suitable support member such as a support frame, the vehicle seat and/or vehicle seat frame. In any case, the one or more locks $202_1$-$202_N$, when activated, serve to ensure that an object, e.g., the object 12 illustrated and described herein, is retained within, or otherwise secured by the object restraining apparatus under dynamic loading conditions such as those associated with vehicle crashes, vehicle roll-over events, and the like. In any case, when any of the locks $202_1$-$202_N$ are deactivated, the object. e.g., the object 12, may be positioned within and removed from an associated one of the object retention assemblies.

The system 200 further includes a control circuit 206 that is electrically connected to each of the electronic actuators $204_1$-$204_N$ via a corresponding one of a number of signal lines $208_1$-$208_N$. The control circuit 206 is conventional, and may be or include a microprocessor having, or having access to, a memory unit 205. The control circuit 206 is operable to execute instructions stored within the memory unit 205 to control activation and deactivation of the number of locks $202_1$-$202_N$ via electronic control of corresponding ones of the actuators $204_1$-$204_N$. Alternatively or additionally, the control circuit 206 may be or include one or more signal processing circuits operable as will be described hereinafter to control the operation of the one or more object restraining locks $202_1$-$202_N$.

The control circuit 206 is operable to control the operational states of each of the one or more locks $202_1$-$202_N$ by controlling the one or more corresponding actuators $204_1$-$204_N$ based on electrical signals produced by one or more sensors and/or switches. In the embodiment illustrated in FIG. 19, for example, the system 200 may include a gear shift lever sensor or switch 210 that is electrically connected to the control circuit, and that is configured to produce a signal indicative of a position of the gear shift lever associated with the vehicle. In cases where the vehicle includes an automatic transmission, for example, the control circuit 206 may be configured to produce a control signal that activates one or more of the actuators $204_1$-$204_N$ when the gear shift lever sensor or switch 210 indicates that the gear shift lever is in a position other than the "park" position, e.g., when the gear shift lever sensor or switch 210 indicates that the gear shift lever is in the "reverse," "neutral" or "drive" position, and to produce a control signal that deactivates one or more of the actuators $204_1$-$204_N$ when the gear shift lever sensor or switch 210 indicates that the gear shift lever is in the park position.

The system 200 may further include a vehicle speed sensor 212 that is electrically connected to the control circuit 206, and that is configured to produce a sensor signal corresponding to the road speed of the vehicle carrying the system 200. Illustratively, the control circuit 206 may be configured to produce a control signal that activates one or more of the actuators $204_1$-$204_N$ when the sensor signal produced by the vehicle speed sensor 212 indicates that the road speed of the vehicle is above a first road speed value, and to produce a control signal that deactivates one or more of the actuators $204_1$-$204_N$ when the sensor signal produced by the vehicle speed sensor 212 indicates that the road speed is below a second road speed value. Further illustratively, the first road speed value is greater than the second road speed value to provide for hysterisis in the switching of the actuators $204_1$-$204_N$, although this disclosure contemplates other embodiments in which the first road speed value is not greater than the second road speed value.

The system 200 may further include a master switch 214 that is electrically connected to the control circuit 206, and that is configured to produce a switch signal that corresponds to a position of the master switch 214. Illustratively, the master switch may be a manually activated switch that is accessible only by an operator of the vehicle or by an occupant of the vehicle that is seated next to the operator of the vehicle. In any case, the control circuit 206 may be configured to produce a control signal that activates one or more of the actuators $204_1$-$204_N$ when the master switch 214 is manually activated, and to produce a control signal that deactivates one or more of the actuators $204_1$-$204_N$ when the master switch 214 is deactivated.

The system 200 may further include a number, N, of over-ride switches $216_1$-$216_N$, each of which is electrically connected to the control circuit 206. Illustratively, each of the number of over-ride switches $216_1$-$216_N$ may be positioned within reach of an occupant of a vehicle seat to which one of the corresponding number of object restraining apparatuses is mounted so that the occupant may manually activate and deactivate a corresponding one of the over-ride switches $216_1$-$216_N$ under specified conditions. In any case, the control circuit 206 may be configured to produce a control signal that activates one the actuators $204_1$-$204_N$ when a corresponding one of the over-ride switches $216_1$-$216_N$ is manually activated, and to produce a control signal that deactivates the actuator $204_1$-$204_N$ when the over-ride switch $216_1$-$216_N$ is deactivated.

Referring now to FIG. 20, a flow chart is shown of one illustrative embodiment of a process 250 that is executable by the control circuit 206 to control activation and deactivation of the number of actuators $204_1$-$204_N$ based on the sensor and/or switch signals produced by one or more of the sensors and/or switches 210, 212, 214 and/or $216_1$-$216_N$. The process 250 may be provided in the form of one or more sets of instructions that are executable by the control circuit 206 to control operation of the actuators $204_1$-$204_N$. In the illustrated embodiment, the process 250 begins at step 252, and thereafter at step 254 the control circuit 206 is operable to determine whether one or more of the object restraining locks $202_1$-$202_N$ is activated. Because the control circuit 206 controls operation of the one or more actuators $204_1$-$204_N$, the control circuit 206 has knowledge of the operational state of each of the number of locks $202_1$-$202_N$. In alternative embodiments, the one or more actuators $204_1$-$204_N$ may each include a corresponding actuator position sensor, or may be otherwise configured to produce a signal corresponding to actuator position, which is then supplied back to the control circuit 206 via a corresponding one of the signal lines $208_1$-

$208_N$, or via one of a number of additional signal lines. In any case, the process 250 advances from the no branch of step 254 to step 256 where the control circuit 256 is operable to monitor one or more of the object restraining lock activation indicators, i.e., one or more of the sensors and/or switches 210, 212, 214 and/or $216_1$-$216_N$. From step 256, the process 250 advances to step 258 where the control circuit 206 is operable to determine whether any of the object restraining lock activation conditions have been met.

In one embodiment of the process 250, the control circuit 206 is operable at step 256 and 258 to monitor the gear shift lever sensor or switch 210 and to determine that an object restraining lock activation condition is met if the signal produced by the gear shift lever sensor or switch indicates that the gear shift lever is in a position other than the "park" position. In an alternative embodiment of the process 250, the control circuit 206 is operable at step 256 and 258 to monitor the vehicle speed sensor 212 and to determine that an object restraining lock activation condition is met if the signal produced by the vehicle speed sensor 212 indicates that the road speed of the vehicle carrying the system 200 is greater than a first road speed value. Illustratively, the first road speed value may correspond to a minimum discernable road speed that is indicative of a moving vehicle, e.g., 2-5 miles per hour, although this disclosure contemplates other first road speed values. In another alternative embodiment of the process 250, the control circuit 206 is operable at step 256 and 258 to monitor the master switch 214 and to determine that an object restraining lock activation condition is met if the signal produced by the master switch 214 indicates that the master switch has been manually activated. In yet another alternative embodiment of the process 250, the control circuit 206 is operable at step 256 and 258 to monitor the one or more switches $216_1$-$216_N$ and to determine that an object restraining lock activation condition is met if the signal(s) produced by any of the one or more switches $216_1$-$216_N$ indicate(s) that one or more of the switches $216_1$-$216_N$ has/have been manually activated.

In other alternative embodiments of the process 250, the control circuit 206 may be operable to monitor one or more combinations of the sensors and/or switches 210, 212, 214 and/or $216_1$-$216_N$, and to determine that an object restraining lock activation condition is met if the combination of signals produced by the one or more combinations of the sensors and/or switches 210, 212, 214 and/or $216_1$-$216_N$ meet specified conditions. For example, the control circuit 206 may be configured to be operable at step 256 and 258 to monitor the gear shift lever sensor or switch 210 and the vehicle speed sensor 212, and to determine that an object restraining lock activation condition is met if the signal produced by the gear shift lever sensor or switch indicates that the gear shift lever is in a position other than the "park" position and the signal produced by the vehicle speed sensor indicates that the road speed of the vehicle carrying the system 200 is greater than a specified road speed value. As another example, the control circuit 206 may be configured to be operable at steps 256 and 258 to monitor the signals produced by the master switch 214 and the signals produced by the one or more over-ride switches $216_1$-$216_N$, and to determine that an object restraining lock activation condition is met if the signal produced by the master switch 214 indicates that the master switch has been manually activated and the signal produced by any of the one or more over-ride switches $216_1$-$216_N$ then indicates that one or more of the over-ride switches $216_1$-$216_N$ has/have been manually activated. In this example, the master switch 214 acts as an enabling switch that allows, only when manually activated, any of the one or more over-ride switches $216_1$-$216_N$ to then control the state of a corresponding one of the actuators $204_1$-$204_N$. Those skilled in the art will recognize other combinations of the sensors and/or switches 210, 212, 214 and/or $216_1$-$216_N$, that may be monitored and processed to determine that an object restraining lock activation condition is met, and any such other combinations are contemplated by this disclosure.

If, at step 258, the control circuit 206 determines that one or more of the object restraining lock activation conditions have been met, the control circuit 206 is operable at step 260 to produce control signals on the signal paths $208_1$-$208_N$ that activate corresponding ones of the number of actuators $204_1$-$204_N$ so that corresponding ones of the object restraining apparatus locks $202_1$-$202_N$ are activated. It will be understood that activation of corresponding ones of the number of actuators $204_1$-$204_N$ may mean activating all of the number of actuators $204_1$-$204_N$ in some embodiments, and may alternatively mean activating only specified one of the number of actuators $204_1$-$204_N$ in other embodiments. In any case, when activated, each of the one or more object restraining apparatus locks $202_1$-$202_N$ cause corresponding ones of the object restraining apparatuses to restrain and retain therein a corresponding object, e.g., object 12, under all static, quasi-static and dynamic loading conditions. From step 260, and from the "NO" branch of step 258, the process 250 loops back to step 254.

If, at step 254, the control circuit 206 determines that one or more of the object restraining locks $202_1$-$202_N$ is/are activated, the process 250 advances to step 262 where the control circuit 206 is operable to monitor the one or more object restraining lock deactivation indicators. Thereafter at step 264, the control circuit 206 is operable to determine whether one or more of the object restraining lock deactivation conditions have been met.

In one embodiment of the process 250, the control circuit 206 is operable at step 262 and 264 to monitor the gear shift lever sensor or switch 210 and to determine that an object restraining lock deactivation condition is met if the signal produced by the gear shift lever sensor or switch indicates that the gear shift lever is in the "park" position. In an alternative embodiment of the process 250, the control circuit 206 is operable at step 262 and 264 to monitor the vehicle speed sensor 212 and to determine that an object restraining lock deactivation condition is met if the signal produced by the vehicle speed sensor 212 indicates that the road speed of the vehicle carrying the system 200 is less than a first road speed value. Illustratively, the second road speed value may be zero, i.e., corresponding a stopped vehicle, although this disclosure contemplates other second road speed values. In another alternative embodiment of the process 250, the control circuit 206 is operable at step 262 and 264 to monitor the master switch 214 and to determine that an object restraining lock deactivation condition is met if the signal produced by the master switch 214 indicates that the master switch has been manually deactivated. In yet another alternative embodiment of the process 250, the control circuit 206 is operable at step 256 and 258 to monitor the one or more switches $216_1$-$216_N$ and to determine that an object restraining lock deactivation condition is met if the signal(s) produced by any of the one or more switches $216_1$-$216_N$ indicate(s) that one or more of the switches $216_1$-$216_N$ has/have been manually deactivated.

In other alternative embodiments of the process 250, as described above, the control circuit 206 may be operable to monitor one or more combinations of the sensors and/or switches 210, 212, 214 and/or $216_1$-$216_N$, and to determine that an object restraining lock deactivation condition is met if the combination of signals produced by the one or more combinations of the sensors and/or switches 210, 212, 214 and/or 216$_1$-216$_N$ meet specified conditions. As one example, the control circuit 206 may be configured to be operable at steps 262 and 264 to monitor the signals produced by the master switch 214 and the signals produced by the one or more over-ride switches 216$_1$-216$_N$, and to determine that an object restraining lock deactivation condition is met if the signal produced by the master switch 214 indicates that the master switch has been manually activated and the signal produced by any of the one or more over-ride switches 216$_1$-216$_N$ then indicates that one or more of the over-ride switches 216$_1$-216$_N$ has/have been manually deactivated. In this example, as described above with respect to steps 256 and 258, the master switch 214 acts as an enabling switch that allows, only when manually activated, any of the one or more over-ride switches 216$_1$-216$_N$ to then control the state of a corresponding one of the actuators 204$_1$-204$_N$. Those skilled in the art will recognize other combinations of the sensors and/or switches 210, 212, 214 and/or 216$_1$-216$_N$, that may be monitored and processed to determine that an object restraining lock deactivation condition is met, and any such other combinations are contemplated by this disclosure.

If, at step 264, the control circuit 206 determines that one or more of the object restraining lock deactivation conditions have been met, the control circuit 206 is operable at step 266 to produce control signals on the signal paths 208$_1$-208$_N$ that deactivate corresponding ones of the number of actuators 204$_1$-204$_N$ so that corresponding ones of the object restraining apparatus locks 202$_1$-202$_N$ are deactivated. It will be understood that deactivation of corresponding ones of the number of actuators 204$_1$-204$_N$ may mean deactivating all of the number of actuators 204$_1$-204$_N$ in some embodiments, and may alternatively mean deactivating only specified ones of the number of actuators 204$_1$-204$_N$ in other embodiments. In any case, when deactivated, each of the one or more object restraining apparatus locks 202$_1$-202$_N$ cause corresponding ones of the object restraining apparatuses to retain therein a corresponding object, e.g., object 12, under static conditions, and to allow the corresponding ones of the objects to be positioned within and removed from the corresponding ones of the object restraining apparatuses under quasi-static conditions. From step 266, and from the "NO" branch of step 264, the process 250 loops back to step 254.

Referring now to FIGS. 26 and 27, perspective views of yet another embodiment of an apparatus 300 for restraining an object 11 in a vehicle is shown. Illustratively, the object 11 is an elongated object such as a Self Contained Breathing Apparatus (SCBA) as illustrated and described above, although it will be understood that the object 11 may alternatively be or include other objects. In the illustrated embodiment, the apparatus 300 includes an elongated frame 302 having a first end 302A and a second end 302B opposite the first end 302A. The frame 302, like the frames 14 and 102 illustrated and described hereinabove, is configured to be mounted within a vehicle generally, and more specifically to at least a portion of a vehicle seat that is mounted within the vehicle. Referring to FIGS. 4 and 5 described hereinabove, an example vehicle seat 80 has a seat bottom 82 and a seat back 86, both of which are mounted to a vehicle seat frame 84 that is mounted within the vehicle. Illustratively, the frame 302 of the apparatus 300 is configured to be mounted to at least the seat back 86, and may be further configured to be also mounted to the vehicle seat frame 84 as illustrated in FIGS. 4 and 5.

Referring again to FIGS. 26 and 27, the apparatus 300 further includes a clamp member 310 that is movably mounted to the frame 302. In the illustrated embodiment, the clamp member 310 is movably mounted to the frame 302 at or near the end 302A of the frame 302, although this disclosure contemplates embodiments in which the clamp member 310 is movably mounted to the frame 302 between the ends 302A and 302B. The apparatus 300 includes a pair of support members 308A and 308 extending outwardly from the frame 302, and to which the clamp member 310 is movably mounted, although this disclosure contemplates embodiments having more or fewer such support members. Illustratively, the support members 308A and 308B are mounted to the frame 302 at or near the end 302A thereof via conventional attachment members, e.g., attachment members 305A and 305B, although this disclosure contemplates that the support members 308A and 308B may alternatively be integral with the frame 302 such that the frame 302 and the support members 308A and 308B together form a unitary structure.

The clamp member 310 defines a rear clamping portion 310A and a front clamping portion 310B with the clamp member 310 movably mounted to the support members 308A and 208B between the rear and front clamping portions 310A and 310B. In the illustrated embodiment, the rear and front clamping portions 310A and 310B form a unitary structure, although this disclosure contemplates embodiments in which the rear and front clamping portions 310A and 310B are separate components. In any case, the rear and front clamping portions 310A and 310B together define a generally arcuate object engaging surface 316. Illustratively, any number of gripping arms may extend from the clamp member 310 and engage the object 11 when the object 11 is retained by the apparatus 300, although this disclosure contemplates embodiments that do not include any such gripping arms. In the illustrated embodiment, for example, four such gripping arms 312A, 312B, 314A and 314B extend laterally from the clamp member 310. Two of the gripping arms 312A and 312B extend laterally from either side of the front clamping portion 310B, and the remaining two gripping arms 314A and 314B extend laterally from either side of the rear clamping portion 310A.

Illustratively, the one or more support members, e.g., 308A and 308B, define one or more slots or channels therethrough, and one or more corresponding protrusions extend from the clamp member 310 into the one or more channels to movably mount the clamp member 310 to the frame 302. In the illustrated embodiment, for example, the support member 308A defines two channels 322 and 332 therethrough, and two corresponding protrusions 320 and 330 extend from the clamp member 310 and into and through the channels 322 and 332. Although not specifically illustrated in FIGS. 26 and 27, the support member 308B likewise defines two channels therethrough that are identical to the channels 322 and 332, and two corresponding protrusions that are identical to the protrusions 320 and 330 extend from the clamp member 310 and into these channels.

The channel 322 is generally an elongated channel that extends perpendicularly away from a longitudinal axis of the frame 302 and generally parallel with a longitudinal axis of the support member 308A. The protrusion 320 extends generally perpendicularly away from a longitudinal axis of the clamp member 310, and into and through the channel 322. The channel 332 has a first portion or section that is adjacent to one end of the channel 322 and that extends generally parallel with and away from the channel 322. A second portion or section of the channel 332 extends from the first section of the channel 332 in a direction that is generally parallel with the longitudinal axis of the frame 302 and generally perpendicular to the longitudinal axis of the support member 308A. The intersection of the first and second sections of the channel 332 illustratively forms a substantially right angle, although this disclosure contemplates other embodiments in which the angle between the first and second sections of the channel 332 is not a substantially right angle. The protrusion 330 extends generally perpendicularly away from a longitudinal axis of the clamp member 310, and into and through the channel 332. As described hereinabove, the support member 308B defines channels therethrough that are identical to the channels 322 and 332, and two protrusions that are identical to the protrusions 320 and 330 extend away from the clamp member 310 and into these channels. The clamp member 310 is configured to move relative to the support members 308A and 308B via travel of the protrusions 320 and 330 along the corresponding channels 322 and 332 respectively.

The clamp member 310 is generally movable relative to the support members 308A and 308B between two extreme positions. One extreme position of the clamp member 310 relative to the support members 308A and 308B is defined by the protrusion 320 reaching the end or near the end of the channel 322 that is furthest from the elongated frame 302 and by the protrusion 330 reaching the end or near the end of the channel 332 that is furthest from the channel 322. This extreme position of the clamp member 310 relative to the support members 308A and 308B is illustrated in FIG. 26, and is the open or unloaded position of the clamp member 310, i.e., when the object 11 has not been loaded into or positioned within the apparatus 300. The other extreme position of the clamp member 310 relative to the support members 308A and 308B is defined by the protrusion 320 reaching the end or near the end of the channel 322 that is closest to the elongated frame 302 and by the protrusion 330 reaching the end or near the end of the channel 332 that is closest to the channel 322. This extreme position of the clamp member 310 relative to the support members 308A and 308B is illustrated in FIG. 27, and is the closed or loaded position of the clamp member 310, i.e., when the object 11 has been loaded into or positioned within the apparatus 300. In the closed or loaded position, one end of the object 11 is in contact with the lower end 302B of the frame 302, and the clamp member 310 engages the opposite end 11A of the object 11 such that the object 11 is trapped or positioned between the clamp member 310 and the end 302B of the frame 302.

The apparatus 300 further includes a blocking member 340 that is movably mounted to the support member 308A. Illustratively, the blocking member 340 defines one or more slots or channels therethrough, and one or more corresponding protrusions extend from the support member 308A into the one or more channels to movably mount the blocking member 340 to the support member 308A. In the illustrated embodiment, for example, the blocking member 340 defines two channels 344 and 348 therethrough, and two corresponding protrusions 342 and 346 extend from the support member 308A and into and through the channels 344 and 348. The channels 344 and 348 are generally elongated channels that extend generally parallel with a longitudinal axis of the blocking member 340. The protrusions 342 and 346 are positioned generally parallel with the longitudinal axis of the support member 308A, and extend into and through the channels 344 and 348 respectively. The blocking member 340 is thus movable relative to the support member 308A in directions that are generally perpendicular to the longitudinal axis of the elongated frame 302 and parallel with the longitudinal axis of the support member 308A.

Illustratively, the support members 308A and 308B, as well as the blocking member 340, are provided in the form of generally flat, rigid sheet or plate material. Examples of such rigid sheet or plate material include, but are not limited to, steel or other metal or metal composite, ceramic, rigid plastic material, or the like. In any case, the one or more support members, e.g., 308A and 308B, will be generally understood to form part of the overall frame 302. Accordingly, the clamp member 310 and the blocking member 340 may be referred to herein and/or in the appended claims as being movably mounted to the frame. Likewise, the one or more channels defined through the support member 308A, e.g., the channels 322 and 332, may be referred to herein and/or in the appended claims as being defined in and/or through the frame, and the one or more protrusions extending from the support member 308A, e.g., the protrusions 342 and 348, may be referred to herein and/or in the appended claims as extending from the frame.

Referring now to FIGS. 28-30, side elevational views of the apparatus 300 are shown illustrating a process for loading the object 11 into the apparatus 300 so that the object 11 is ultimately positioned between the clamp member 310 and the end 302B of the frame 302. It will be understood that FIGS. 28-30 are not intended to represent the detailed physical structure of the apparatus 300 illustrated in FIGS. 26 and 27, and the apparatus 300 illustrated in FIGS. 28-30 is instead simplified to illustrate operation thereof. In any case, the apparatus 300 is generally configured such that the object 11 may be received between, and may be removed from between, the clamp member 310 and the end 302 of the frame 302 under quasi-static conditions. For purposes of this description, quasi-static conditions are intended to describe conditions under which the blocking member 340 remains stationary relative to the support member 308A and/or under which any movement of the blocking member 340 relative to the support member 308A does not block or otherwise impede movement of the clamp member 310 between its two extreme positions relative to the support member 308A, as the two extreme positions of the clamp member 310 are described hereinabove.

FIGS. 28-30 illustrate two additional structural components that were not illustrated or described with respect to FIGS. 26 and 27. One of the additional structural components is a biasing member 350 that is connected at one end 352 to the frame 302 or alternatively to the support member 308A, and at an opposite end 354 to the clamp member 310, e.g., to the rear portion of 310A of the clamp member 310. The biasing member 350 is illustratively provided in the form of a conventional coil spring, although other conventional biasing components may alternatively be used, e.g., flat spring or the like. Generally, the biasing member 350 exerts a biasing force on the clamp member 310 that normally draws the clamp member 310 inwardly toward the elongated frame 302. The biasing force exerted by the biasing member 350 will generally be effective only under quasi-static conditions and only when the protrusion 330 is positioned within the first section of the channel 332, i.e., the section of the channel 332 that is closest to the channel 322, as illustrated in FIGS. 29 and 30. The other additional structural component is another biasing member 360 that is connected at one end 362 to the frame 302 or to the support member 308A, and at an opposite end 364 to the blocking member 340. The biasing member 360 is illustratively provided in the form of a conventional coil spring, although other conventional biasing components may alternatively be used, e.g., flat spring or the like. Generally, the biasing member 360 exerts a biasing force on the blocking member 340 that normally draws the blocking member 340 rearwardly away from the second section of the channel 332, i.e., the section of the channel 332 that is furthest from the channel 322, as illustrated in each of FIGS. 28-30. The biasing force exerted by the biasing member 360 will generally be effective only under quasi-static conditions will generally be overcome under dynamic loading conditions as will be described in detail hereinafter.

FIG. 28 represents the open or unloaded position of the clamp member 310 relative to the frame as described hereinabove. With one end of the object 11 positioned in contact with the lower end 302B of the frame 302, the object 11 is moved in the direction 325 so that the end 11A of the object 11 comes into contact with the clamp member 310 as illustrated in FIG. 28. Continued forcing of the end 11A against the clamp member 310 in the direction 325 causes the object 11 to come into contact with the rear portion 310A of the clamp member 310. Continued forcing of the end 11A against the rear portion 310A of the clamp member 310 then causes the protrusion 330 to travel along the second section of the channel 332 toward the first section of the channel 332, thus causing the front portion 310B of the clamp member 310 to move downwardly over, and then into contact with, the end 11A of the object, as illustrated in FIG. 29. With both the rear and front portions 310A and 310B respectively of the clamp member 310 in contact with the end 11A of the object 11, continued forcing of the end 11A of the object 11 against the rear portion 310A of the clamp member 310 causes the entire clamp member 310 to move rearwardly toward the elongated frame 302 as the protrusions 320 and 330 travel along the respective channels 322 and 332 toward the channel ends that are closest to the elongated frame 302 as illustrated in FIG. 30. This rearward movement of the clamp member 310 is assisted or facilitated by the biasing force that is applied by the biasing member 350 between the frame 302 and the clamp member 310. The biasing force applied by the biasing member 350 further serves to facilitate maintaining the clamp member 310 in the closed or loaded position illustrated in FIG. 30 under quasi-static conditions so that the object 11 remains positioned and retained between the clamp member 310 and the end 302B of the frame 302 under the quasi-static conditions. The object 11 may be removed from between the clamp member 310 and the end 302B of the frame 302 under quasi-static conditions by forcing the end 11A of the object 11 against the front portion 310B of the clamp member 310 and following the above process in reverse order.

Figure 31:
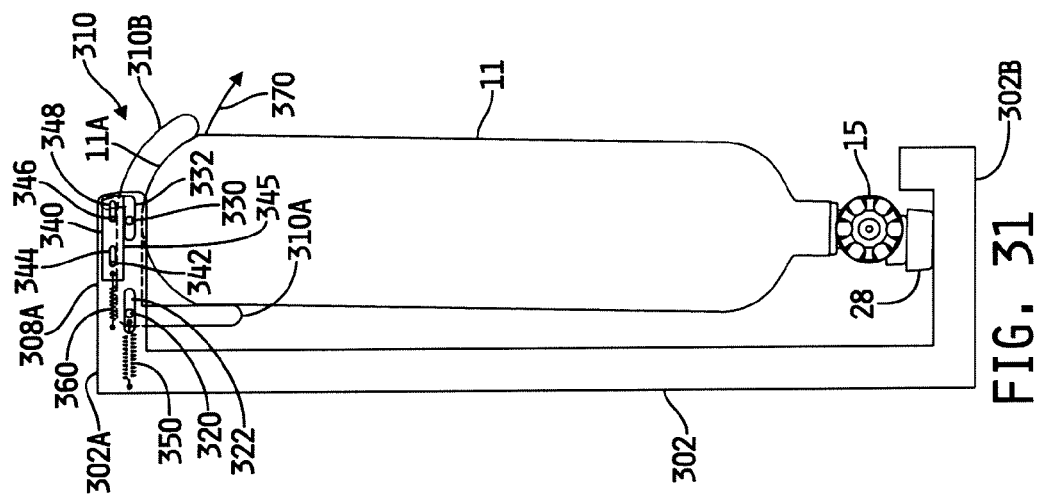
FIG. 31 is a side elevational view of the apparatus of FIGS. 26 and 27 illustrating operation of the apparatus under dynamic loading conditions.
Figure 32:
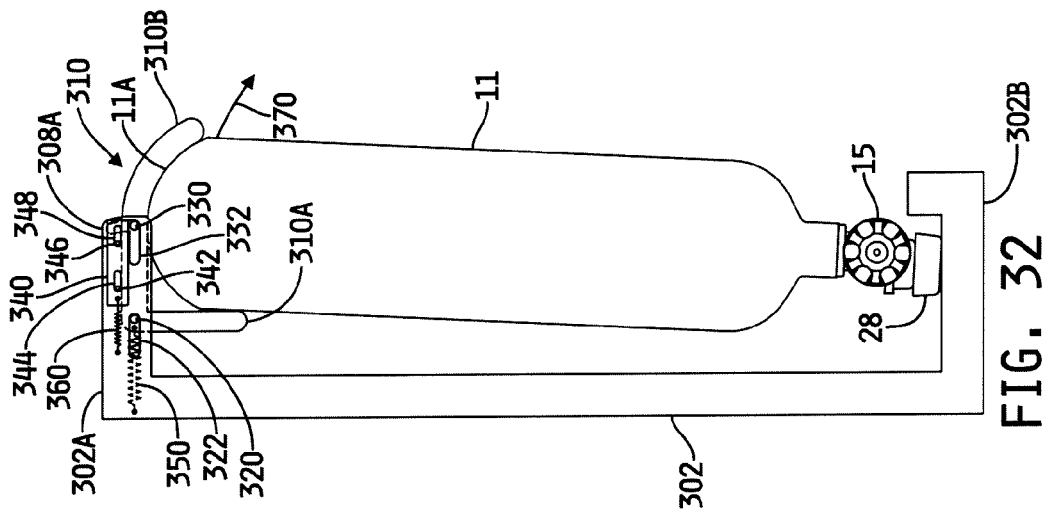
FIG. 32 is a side elevational view of the apparatus of FIGS. 26 and 27 further illustrating operation of the apparatus under dynamic loading conditions.

Referring now to FIGS. 31 and 32, side elevational views of the apparatus 300 are shown illustrating operation of the apparatus 300 under dynamic loading conditions. Under dynamic loading conditions, as described hereinabove, inertial forces are directed outwardly from the frame 302 in the direction toward the object 11 as illustrated by the directional arrow 370. Under such dynamic loading conditions, the blocking member 340 is generally movable relative to the support member 308A between two extreme positions. One extreme position of the blocking member 340 relative to the support member 308A is defined by the protrusions 342 and 346 being at or near the ends of the channels 344 and 348 respectively that are furthest from the elongated frame 302, as illustrated in FIGS. 28-30. This position of the blocking member 340 is generally maintained under quasi-static conditions by the biasing force applied by the biasing member 360 between the support member 308A and the blocking member 340. The other extreme position of the blocking member 340 relative to the support member 308A is defined by the protrusions 342 and 346 being at or near the ends of the channels 344 and 348 respectively that are closest to the elongated frame 302 as illustrated in FIGS. 31 and 32. As illustrated in FIGS. 31 and 32, this position of the blocking member 340 has a portion of the blocking member 340 extending at least partially across the second portion of the channel 332, i.e., the portion of the channel 332 that is furthest from the channel 322 and from the elongated frame 302. Because the protrusion 330 extends through and beyond the channel 332 (see FIGS. 26 and 27), the bottom edge or surface 345 of the blocking member 340 thus creates a barrier to movement of the protrusion 330 into the second section of the channel 332. Thus, when the blocking member 340 moves to the blocking position illustrated in FIGS. 31 and 32 under the dynamic loading conditions, the blocking member 340 blocks movement of the clamp member 310 sufficiently to maintain the clamp member 310 in contact with the end 11A of the object 11 and therefore sufficiently to retain the object 11 between the clamp member 310 and the end 302B of the frame 302 under the dynamic loading conditions.

The biasing force of the biasing member 360 and the mass of the blocking member 340 are selected to ensure that, under the dynamic loading conditions, the mass of the blocking member 340 is sized relative to the biasing force of the biasing member 360 such that the biasing force of the biasing member 360 is overcome by the blocking member 340 and that the blocking member 340 then moves to the blocking position, i.e., with a portion of the blocking member 340 extending at least partially across the second portion of the channel 332, before the protrusion 330 reaches the second portion of the channel 332. This feature is illustrated in FIGS. 31 and 32. In FIG. 31, a dynamic loading event has just occurred, causing an inertial force to be applied by the object 11 to the clamp member 310 in the direction of the arrow 370. As the biasing force of the biasing member 350 is overcome by the mass of the object 11 in response to the dynamic loading event, the protrusions 320 and 330 begin to travel along the channels 322 and 332 respectively. At the same time, the inertial force 370 acting upon the mass of the blocking member 340 causes the blocking member 340 to overcome the biasing force of the biasing member 360 and quickly move to the blocking position described above. The protrusions 320 and 330 continue to travel forwardly along the channels 322 and 332 respectively as the inertial force 370 resulting from the dynamic load event continues to force the end 11A of the object against the clamp member 310, and when the protrusion 330 reaches the end of the first portion of the channel 332, it is blocked from entering the second portion of the channel 332 by the blocking member 340 that has already moved to its blocking position. Because the protrusion 330 cannot enter into, and travel along, the second portion of the channel 332, the clamp member 310 is maintained in a position that retains the object 11 between the clamp member 310 and the end 302B of the frame 302.

Referring now to FIGS. 33-37, yet another illustrative embodiment of an object restraining apparatus 400 is shown. The apparatus 400 is identical in its overall structure and operation to the apparatus 300, although some of the structural components and features of the apparatus 400 are different than corresponding components and features of the apparatus 300. The structural components of the apparatus 400 are numbered consistently with the corresponding structural components of the apparatus 300 so that the reference numbers of the two embodiments differ only by a factor of 100. Unless specifically described below, it will be understood that the remaining components of the apparatus 400 are identical in structure and operation with correspondingly numbered components of the apparatus 300.

One of the structural differences between the apparatuses 300 and 400 is the location and configuration of the channels defined through the support members 408A and 408B (408B not shown). More specifically, the channel 422 has a first portion or section that extends generally perpendicular to the longitudinal axis of the elongated frame 302, and a second portion or section that extends downwardly from the first section and generally parallel with the longitudinal axis of the elongated frame 302. The blocking member 440 is positioned such that it resides between the elongated frame 302 and the second portion of the channel 422 under quasi-static conditions, as illustrated in FIGS. 33-35, and that it extends at least partially across the second portion of the channel 422 under dynamic loading conditions, as illustrated in FIGS. 36-37. The channel 432 is an elongated channel that extends generally perpendicular to the longitudinal axis of the elongated frame 302, and the channels 422 and 432 are positioned such that the channel 422 is located between the end 302A' of the elongated frame 302 and the channel 432.

Another difference between the apparatuses 300 and 400 is the position of the biasing member 450 relative to the clamp member 410. In the apparatus 400, the biasing member is attached at one end 452 to the support member 408A and at an opposite end 454 to the clamp member 410 between the rear portion 410A and the front portion 410B thereof.

The operation of the apparatus 400 is substantially identical to that of the apparatus 300 described above, with the exception of the movement of the protrusions within the channels 422 and 432. For example, FIG. 33 represents the open or unloaded position of the clamp member 410 relative to the frame in which the protrusion 420 is positioned at or near the end of the second portion of the channel 422, i.e., at or near the lowermost end of the channel 422, and in which the protrusion 430 is at or near the end of the channel 432 that is furthest from the elongated frame 302. With one end of the object 11 positioned in contact with the lower end 302B of the frame 302, the object 11 is moved in the direction 425 so that the end 11A of the object 11 comes into contact with the clamp member 410 as illustrated in FIG. 33. Continued forcing of the end 11A against the clamp member 410 in the direction 425 causes the object 11 to come into contact with the rear portion 410A of the clamp member 410. Continued forcing of the end 11A against the rear portion 410A of the clamp member 410 then causes the protrusion 420 to travel upwardly along the second section of the channel 432 toward the first section of the channel 432, thus causing the front portion 410B of the clamp member 410 to move downwardly over, and then into contact with, the end 11A of the object, as illustrated in FIG. 34. With both the rear and front portions 410A and 410B respectively of the clamp member 410 in contact with the end 11A of the object 11, continued forcing of the end 11A of the object 11 against the rear portion 410A of the clamp member 410 causes the entire clamp member 410 to move rearwardly toward the elongated frame 402 as the protrusions 420 and 430 travel rearwardly along the respective channels 422 and 432 toward the channel ends that are closest to the elongated frame 402 as illustrated in FIG. 35. This rearward movement of the clamp member 410 is assisted or facilitated by the biasing force that is applied by the biasing member 450 between the support member 408A and the clamp member 410. The biasing force applied by the biasing member 450 further serves to facilitate maintaining the clamp member 410 in the closed or loaded position illustrated in FIG. 35 under quasi-static conditions so that the object 11 remains positioned and retained between the clamp member 410 and the end 402B of the frame 402 under the quasi-static conditions. The object 11 may be removed from between the clamp member 410 and the end 302B of the frame 302 under quasi-static conditions by forcing the end 11A of the object 11 against the front portion 410B of the clamp member 410 and following the above process in reverse order.

Referring now to FIGS. 36 and 37, side elevational views of the apparatus 400 are shown illustrating operation of the apparatus 400 under dynamic loading conditions. Under dynamic loading conditions, as described hereinabove, inertial forces are directed outwardly from the frame 402 in the direction toward the object 11 as illustrated by the directional arrow 470. Under such dynamic loading conditions, the blocking member 440 is generally movable relative to the support member 408A between two extreme positions. One extreme position of the blocking member 440 relative to the support member 408A is defined by the protrusions 442 and 446 being at or near the ends of the channels 444 and 448 respectively that are furthest from the elongated frame 302, as illustrated in FIGS. 33-34. This position of the blocking member 440 is generally maintained under quasi-static conditions by the biasing force applied by the biasing member 460 between the support member 408A or the elongated frame 302 and the blocking member 440. The other extreme position of the blocking member 440 relative to the support member 408A is defined by the protrusions 442 and 446 being at or near the ends of the channels 444 and 448 respectively that are closest to the elongated frame 302 as illustrated in FIGS. 36 and 37. As illustrated in FIGS. 36 and 37, this position of the blocking member 440 has a portion of the blocking member 440 extending at least partially across the second portion of the channel 432, i.e., the portion of the channel 432 that extends downwardly toward the object 11. Because the protrusion 430 extends through and beyond the channel 432 as described with respect to the apparatus 300, the top edge or surface 445 of the blocking member 440 thus creates a barrier to movement of the protrusion 430 downwardly into the second section of the channel 432. Thus, when the blocking member 440 moves to the blocking position illustrated in FIGS. 36 and 37 under the dynamic loading conditions, the blocking member 440 blocks movement of the clamp member 410 sufficiently to maintain the clamp member 410 in contact with the end 11A of the object 11 and therefore sufficiently to retain the object 11 between the clamp member 410 and the end 302B of the frame 302 under the dynamic loading conditions.

As with the biasing member 360 and the blocking member 340, the biasing force of the biasing member 460 and the mass of the blocking member 440 are selected to ensure that, under the dynamic loading conditions, the mass of the blocking member 440 is sized relative to the biasing force of the biasing member 460 such that the biasing force of the biasing member 460 is overcome by the blocking member 440 and that the blocking member 440 then moves to the blocking position, i.e., with a portion of the blocking member 440 extending at least partially across the second portion of the channel 432, before the protrusion 430 reaches the second portion of the channel 432. This feature is illustrated in FIGS. 36 and 37. In FIG. 36, for example, a dynamic loading event has just occurred, causing an inertial force to be applied by the object 11 to the clamp member 410 in the direction of the arrow 470. As the biasing force of the biasing member 450 is overcome by the mass of the object 11 in response to the dynamic loading event, the protrusions 420 and 430 begin to travel along the channels 422 and 432 respectively. At the same time, the inertial force 470 acting upon the mass of the blocking member 440 causes the blocking member 440 to overcome the biasing force of the biasing member 460 and quickly move to the blocking position described above. The protrusions 420 and 430 continue to travel forwardly along the channels 422 and 432 respectively as the inertial force 470 resulting from the dynamic load event continues to force the end 11A of the object against the clamp member 410, and when the protrusion 430 reaches the end of the first portion of the channel 432, it is blocked from traveling downwardly into the second portion of the channel 432 by the blocking member 440 that has already moved to its blocking position. Because the protrusion 430 cannot enter downwardly into, and travel along, the second portion of the channel 432, the clamp member 410 is maintained in a position that retains the object 11 between the clamp member 410 and the end 402B of the frame 402.

A method or process of restraining an object 11 in a vehicle using either of the apparatuses 300 or 400 may thus include providing a frame having a first end and a second end opposite the first end, movably mounting a clamp member to the frame, mounting the frame within the vehicle, placing one end of the object in contact with the second end of the frame and then forcing an opposite end of the object against the clamp member to move the clamp member and the object together into a position in which the object is trapped between the clamp member and the second end of the frame, and movably mounting a blocking member to the frame such that the blocking member moves under dynamic loading conditions to a position that blocks movement of the clamp member sufficiently to retain the object between the clamp member and the second end of the frame under the dynamic loading conditions.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An apparatus for restraining an object, comprising:
a frame having a first end and a second end opposite the first end, the frame defining at least one channel therein,
a clamp member movably mounted to the frame and movable relative to the frame under quasi-static conditions to allow the object to be received between, and removed from between, the clamp member and the second end of the frame, the clamp member having at least one protrusion that extends into the at least one channel defined by the frame such that the at least one protrusion travels along the at least one channel when the clamp member moves relative to the frame, and
a blocking member movably mounted to the frame and movable relative to the frame under dynamic loading conditions to a position that blocks movement of the clamp member sufficiently to retain the object between the clamp member and the second end of the frame under the dynamic loading conditions, the blocking member blocking movement of the clamp member relative to the frame by extending at least partially across the at least one channel under the dynamic loading conditions to provide a barrier to travel of the at least one protrusion in at least one direction of travel of the at least one protrusion along the at least one channel,
wherein the quasi-static conditions are defined as conditions under which any movement of the blocking member does not block movement of the clamp member,
and wherein the dynamic loading conditions are defined as conditions under which inertial forces are directed outwardly away from the frame in a direction toward the object positioned within the apparatus.

2. The apparatus of claim 1 wherein the clamp member is movably mounted to the frame at or near the first end thereof.

3. The apparatus of claim 1 wherein the clamp member is movable relative to the frame under the quasi-static conditions between a first position, corresponding to an open position of the clamp member in which the object may be positioned within and removed from the apparatus, and a second position, corresponding to a closed position of the clamp member in which the object is positioned within the apparatus,
wherein the clamp member is movable from the first position to the second position to receive the object between the clamp member and the second end of the frame,
and wherein the object is positioned between the clamp member and the second end of the frame when the clamp member is in the second position.

4. The apparatus of claim 3 wherein the clamp member is movable from the second position to the first position to remove the object from between the clamp member and the second end of the frame.

5. The apparatus of claim 1 further comprising a vehicle including a vehicle seat having a seat frame mounted within the vehicle, the vehicle seat further having a seat bottom and a seat back both mounted to the vehicle seat frame,
and wherein the frame is mounted to the seat back.

6. The apparatus of claim 5 wherein the frame is further mounted to the vehicle seat frame.

7. The apparatus of claim 1 wherein the object comprises a cylinder.

8. The apparatus of claim 7 wherein the cylinder comprises an air tank for a self contained breathing apparatus.

9. The apparatus of claim 1 further comprising a biasing member connected between the frame and the blocking member, the biasing member biasing the blocking member, under the quasi-static conditions, away from the position that blocks movement of the clamp member.

10. The apparatus of claim 9 wherein the blocking member has a mass and the biasing member exerts a biasing force on the blocking member,
and wherein the mass of the blocking member is sized to overcome the biasing force of the biasing member under the dynamic loading conditions such that the blocking member moves to the position that blocks movement of the clamp member before the clamp member moves sufficiently relative to frame to allow the object to be removed from between the clamp member and the second end of the frame.

* * * * *